(12) United States Patent
Fujita

(10) Patent No.: US 8,086,046 B2
(45) Date of Patent: Dec. 27, 2011

(54) IMAGE ANALYSIS DEVICE AND IMAGE ANALYSIS METHOD

(75) Inventor: Ryujiro Fujita, Saitama (JP)

(73) Assignee: Pioneer Corporation, Tokyo (JP)

( * ) Notice: Subject to any disclaimer, the term of this patent is extended or adjusted under 35 U.S.C. 154(b) by 1033 days.

(21) Appl. No.: 11/993,980

(22) PCT Filed: Jun. 27, 2006

(86) PCT No.: PCT/JP2006/312807
§ 371 (c)(1),
(2), (4) Date: Dec. 27, 2007

(87) PCT Pub. No.: WO2007/000999
PCT Pub. Date: Jan. 4, 2007

(65) Prior Publication Data
US 2009/0136125 A1 May 28, 2009

(30) Foreign Application Priority Data
Jun. 27, 2005 (JP) ................................. 2005-186294

(51) Int. Cl.
*G06K 9/62* (2006.01)
(52) U.S. Cl. ........................................ 382/224; 382/190
(58) Field of Classification Search ........... 382/181–228
See application file for complete search history.

(56) References Cited

U.S. PATENT DOCUMENTS

| | | | | |
|---|---|---|---|---|
| 5,280,547 A | * | 1/1994 | Mahoney | 382/302 |
| 5,787,201 A | * | 7/1998 | Nelson et al. | 382/224 |
| 5,870,493 A | * | 2/1999 | Vogl et al. | 382/195 |
| 6,072,904 A | * | 6/2000 | Desai et al. | 382/225 |
| 6,721,454 B1 | * | 4/2004 | Qian et al. | 382/224 |
| 6,922,485 B2 | * | 7/2005 | Hirata | 382/164 |
| 7,065,250 B1 | * | 6/2006 | Lennon | 382/224 |
| 7,092,573 B2 | * | 8/2006 | Luo et al. | 382/228 |
| 7,653,485 B2 | * | 1/2010 | Fujita et al. | 701/211 |
| 7,840,061 B2 | * | 11/2010 | Porikli et al. | 382/159 |
| 2003/0210807 A1 | * | 11/2003 | Sato et al. | 382/104 |
| 2009/0231146 A1 | * | 9/2009 | Fujita | 340/576 |

FOREIGN PATENT DOCUMENTS

| | | |
|---|---|---|
| JP | 08-016789 A | 1/1996 |
| JP | 2003-150610 A | 5/2003 |
| JP | 2004-056763 A | 2/2004 |
| JP | 2005-063307 A | 3/2005 |
| JP | 2005-078233 A | 3/2005 |

OTHER PUBLICATIONS

International Search Report of PCT/JP2006/312807 filed Jun. 27, 2006, date of mailing Jul. 25, 2006.

* cited by examiner

*Primary Examiner* — Bhavesh Mehta
*Assistant Examiner* — Sean Motsinger
(74) *Attorney, Agent, or Firm* — Young & Thompson

(57) ABSTRACT

An image corresponding to image data obtained by imaging by a camera is divided into a plurality of image pieces and each of the image pieces is subjected to a color analysis process, a fractal dimension analysis process, and an artificial object amount recognition process. According to a combination of the results obtained by the three processes, a part of a landscape contained in each of the image pieces is classified and the entire characteristic of the landscape contained in the image is judged according to the classification result.

22 Claims, 12 Drawing Sheets

[FIG. 1]
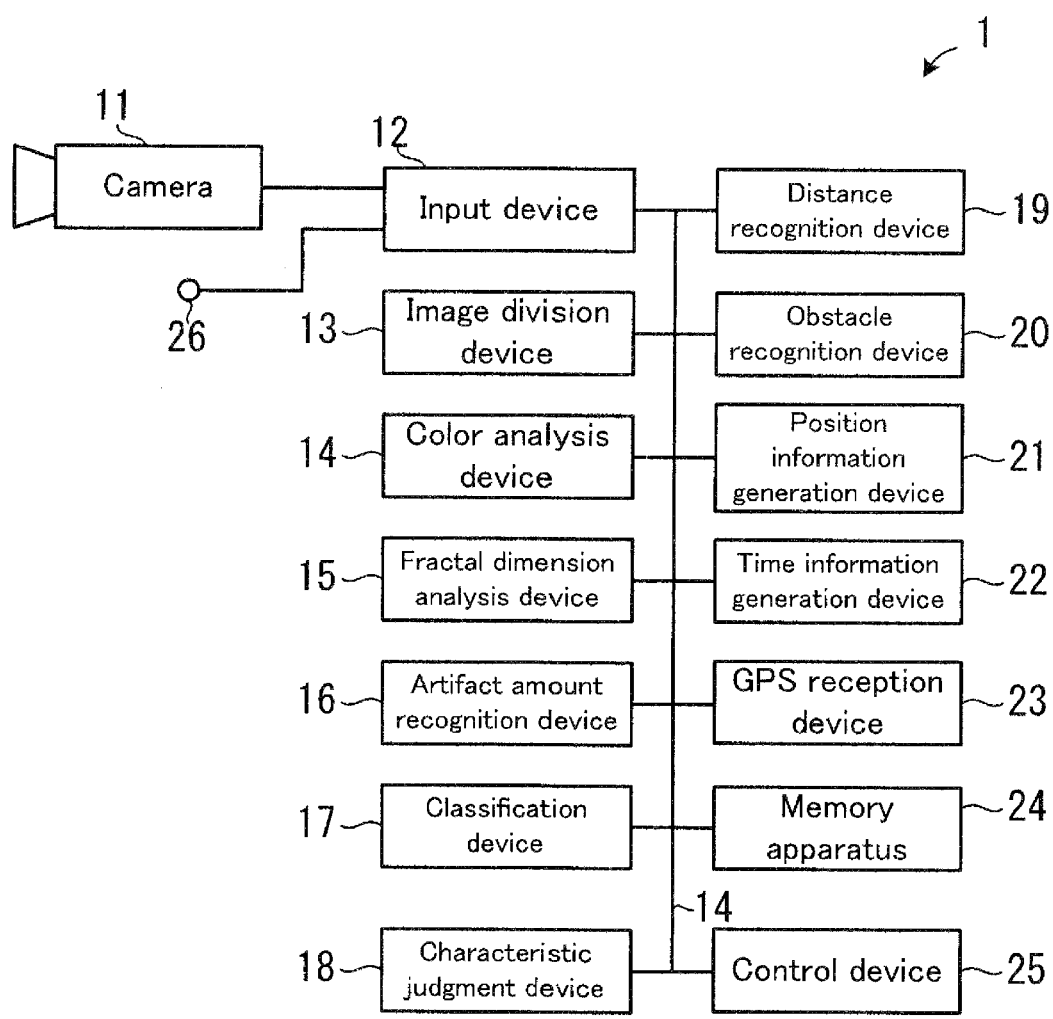

[FIG. 2]
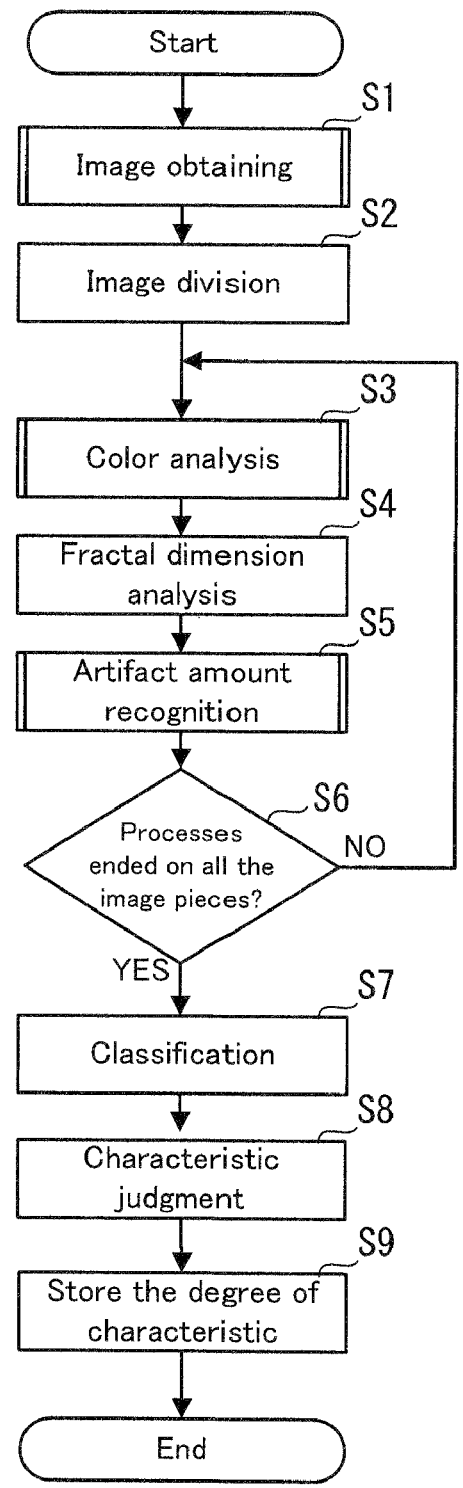

[FIG. 3]
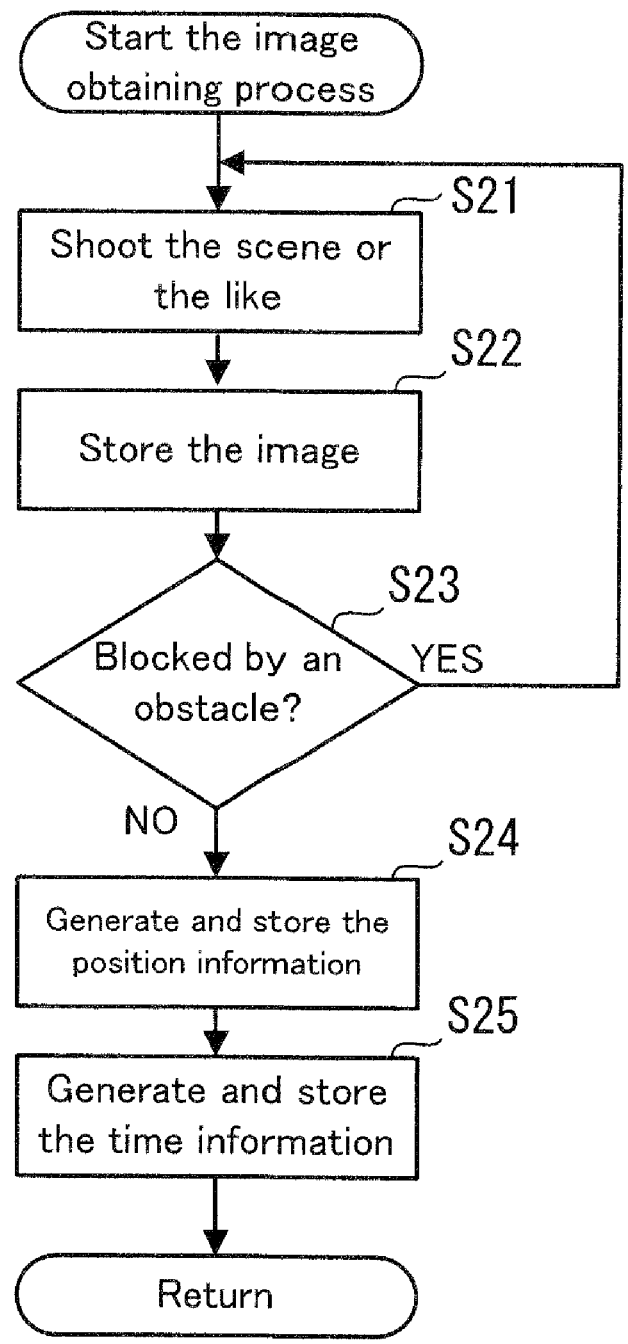

[FIG. 4]
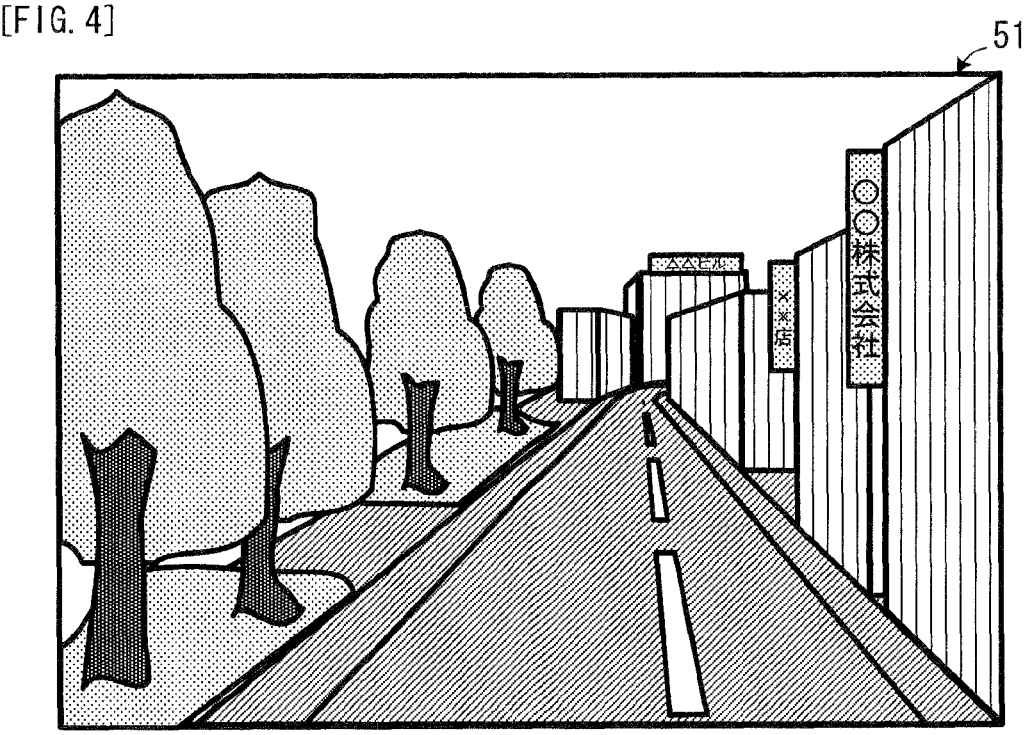
[FIG. 5]
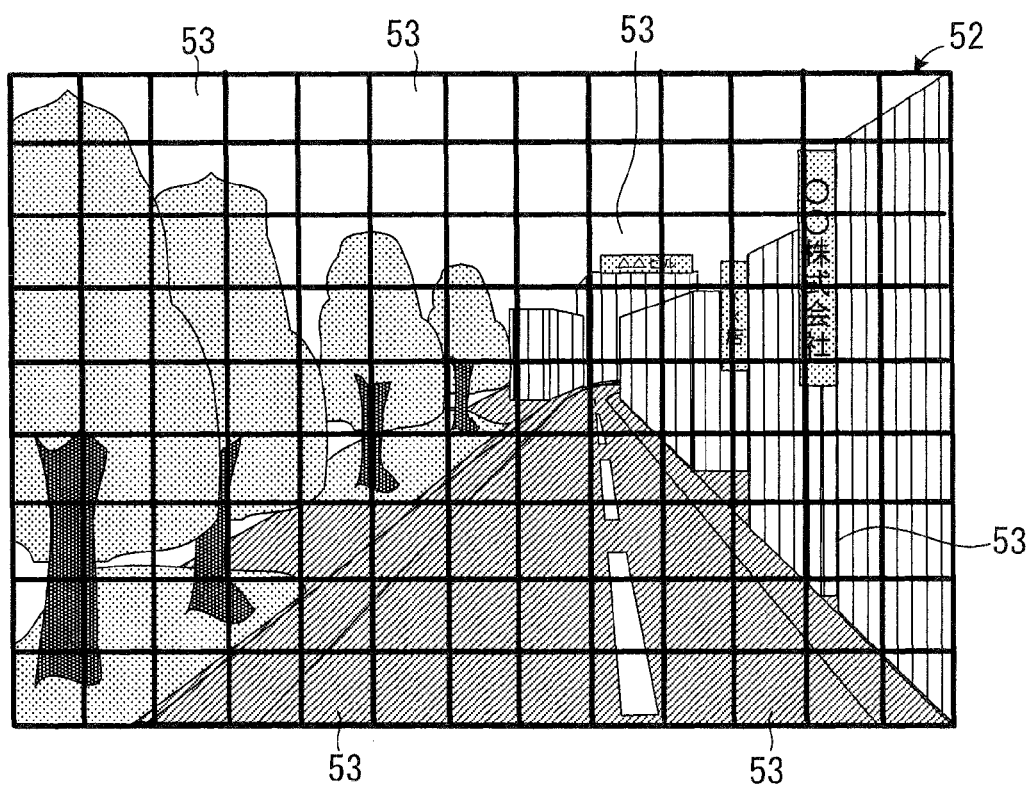

[FIG. 6]
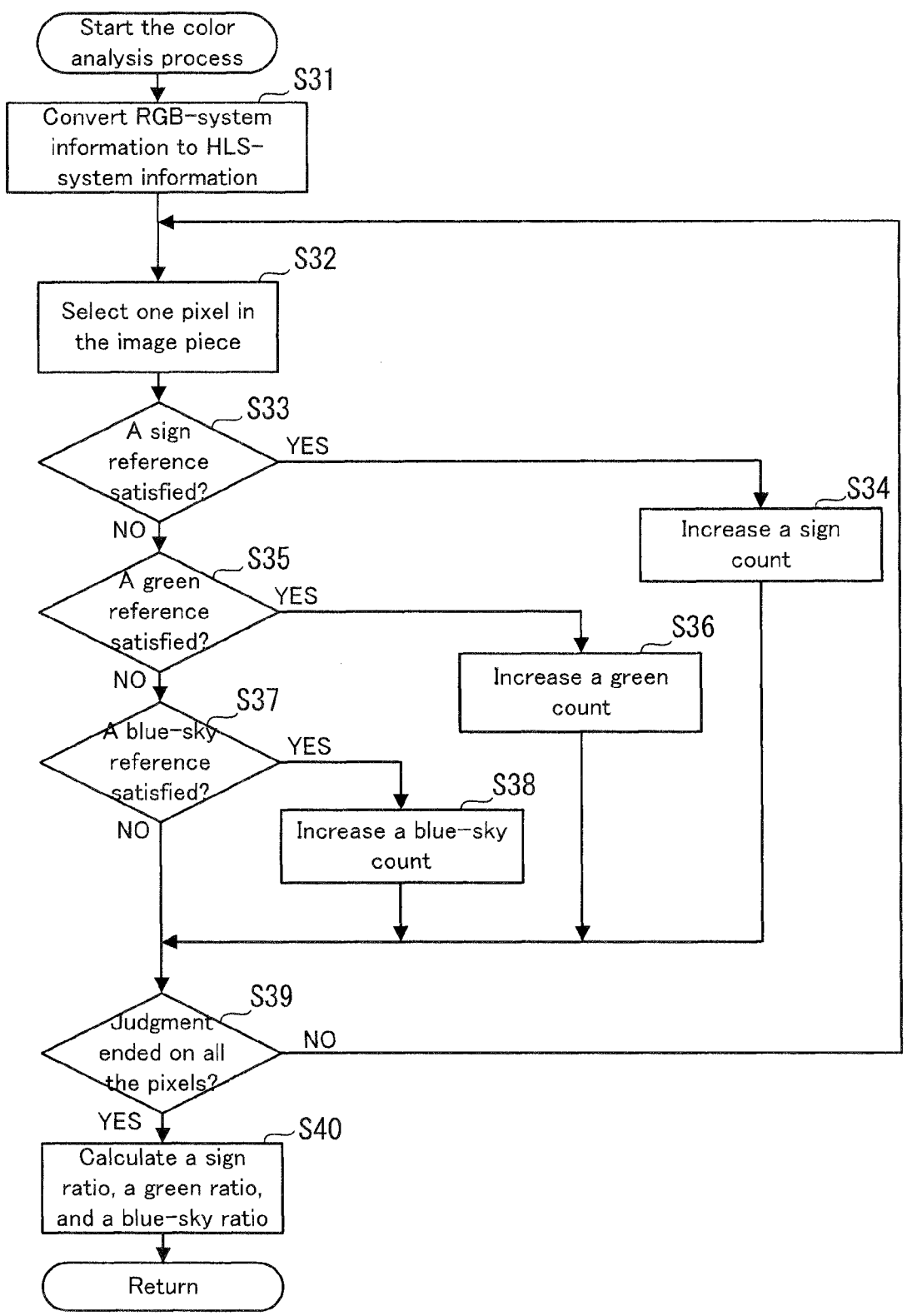

[FIG. 7]
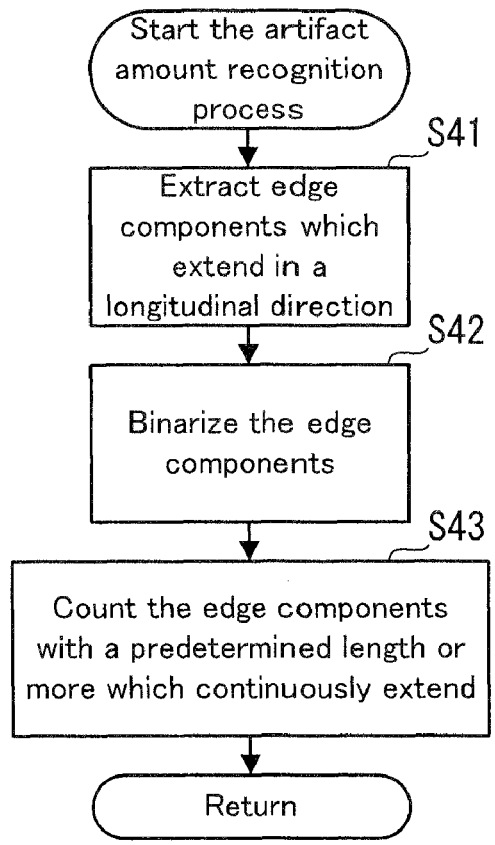
[FIG. 8]
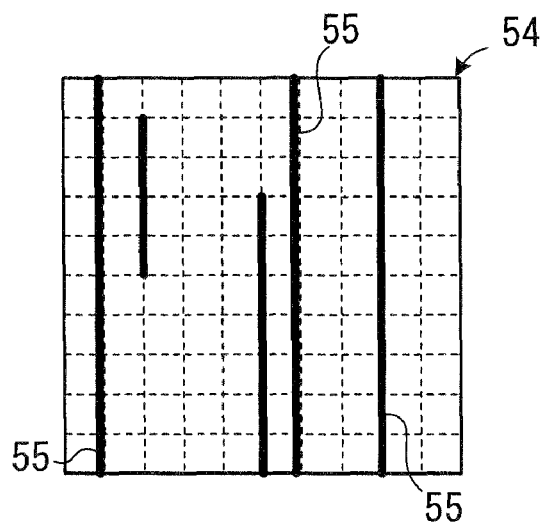

[FIG. 9]

| | Color property | | | Fractal dimension analysis value | Artifact amount count value |
|---|---|---|---|---|---|
| | Green ratio | Blue-sky ratio | Sign ratio | | |
| Plant | high | low | low | high | 0 |
| Sky | low | high | low | low | 0 |
| Artifact | low | low | high | | |
| | | | | | 1 or more |

55

[FIG. 10]
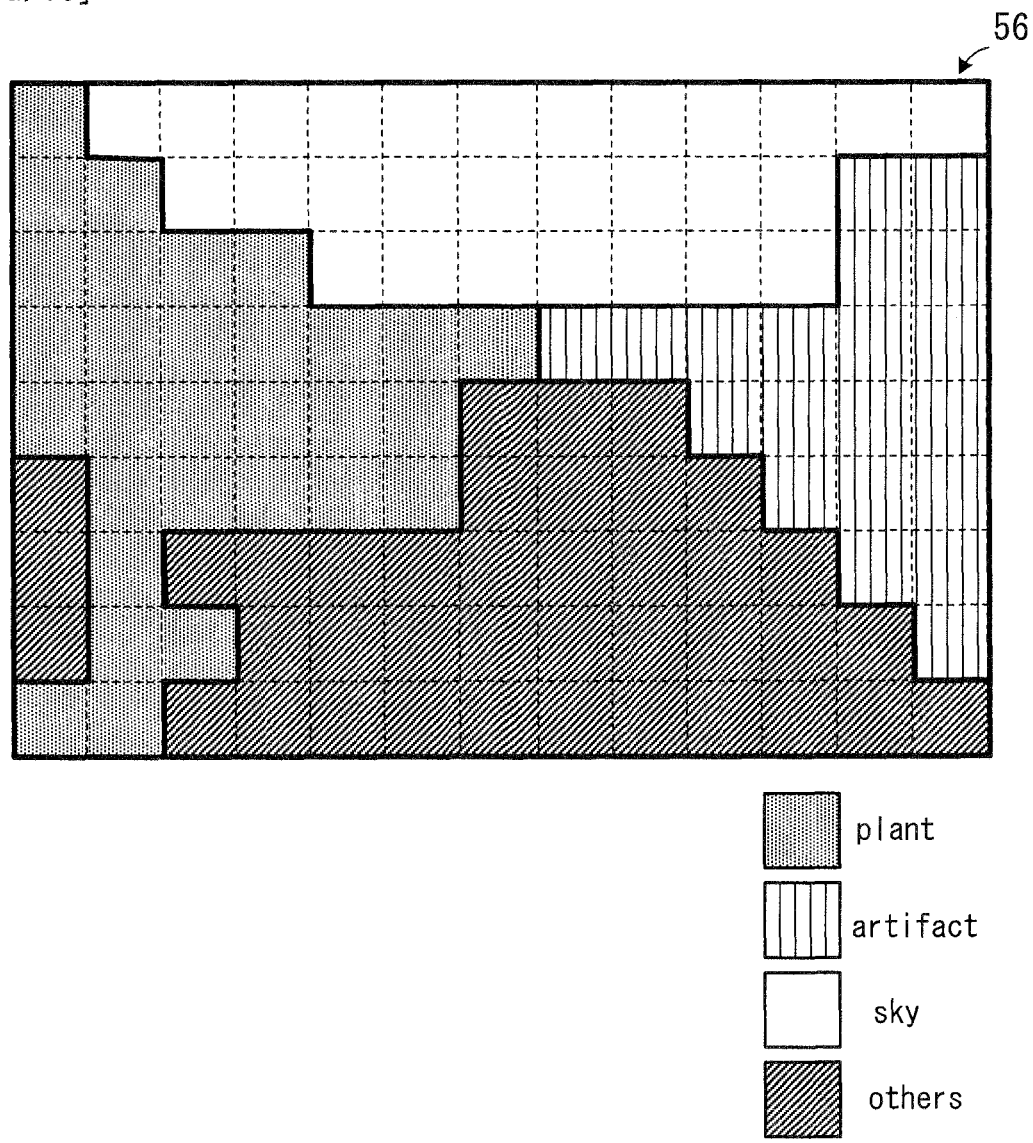

[FIG. 11]
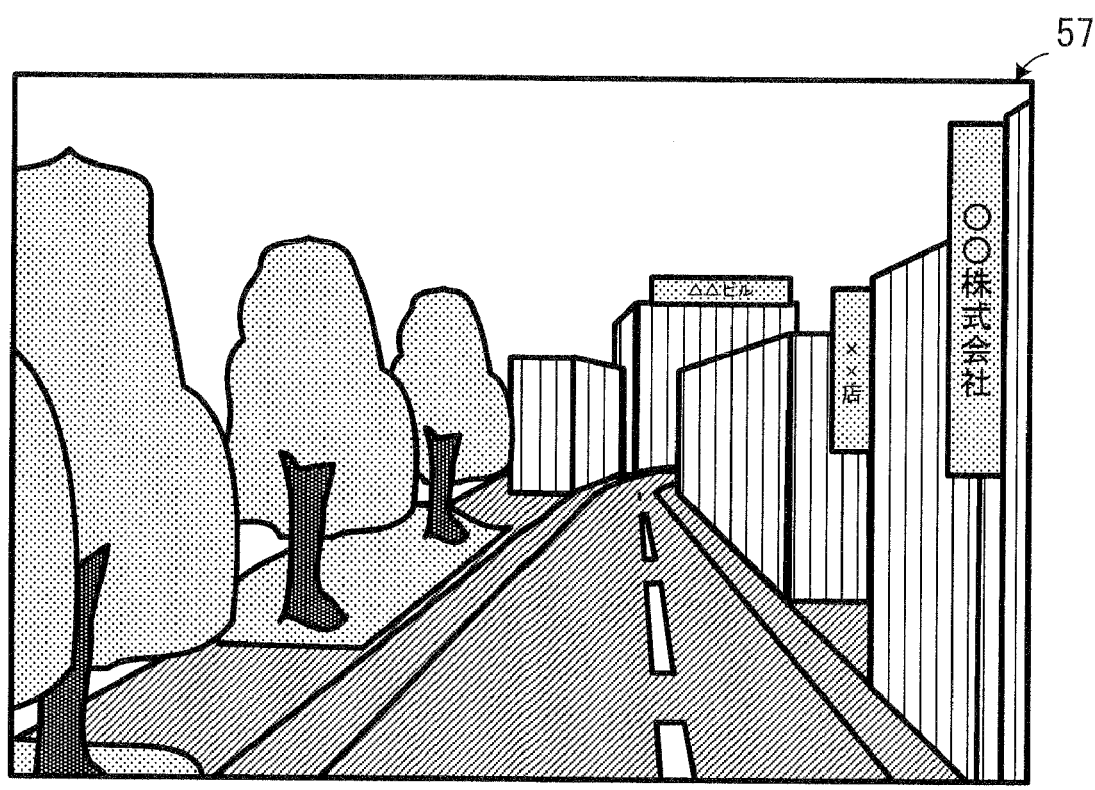

[FIG. 12]
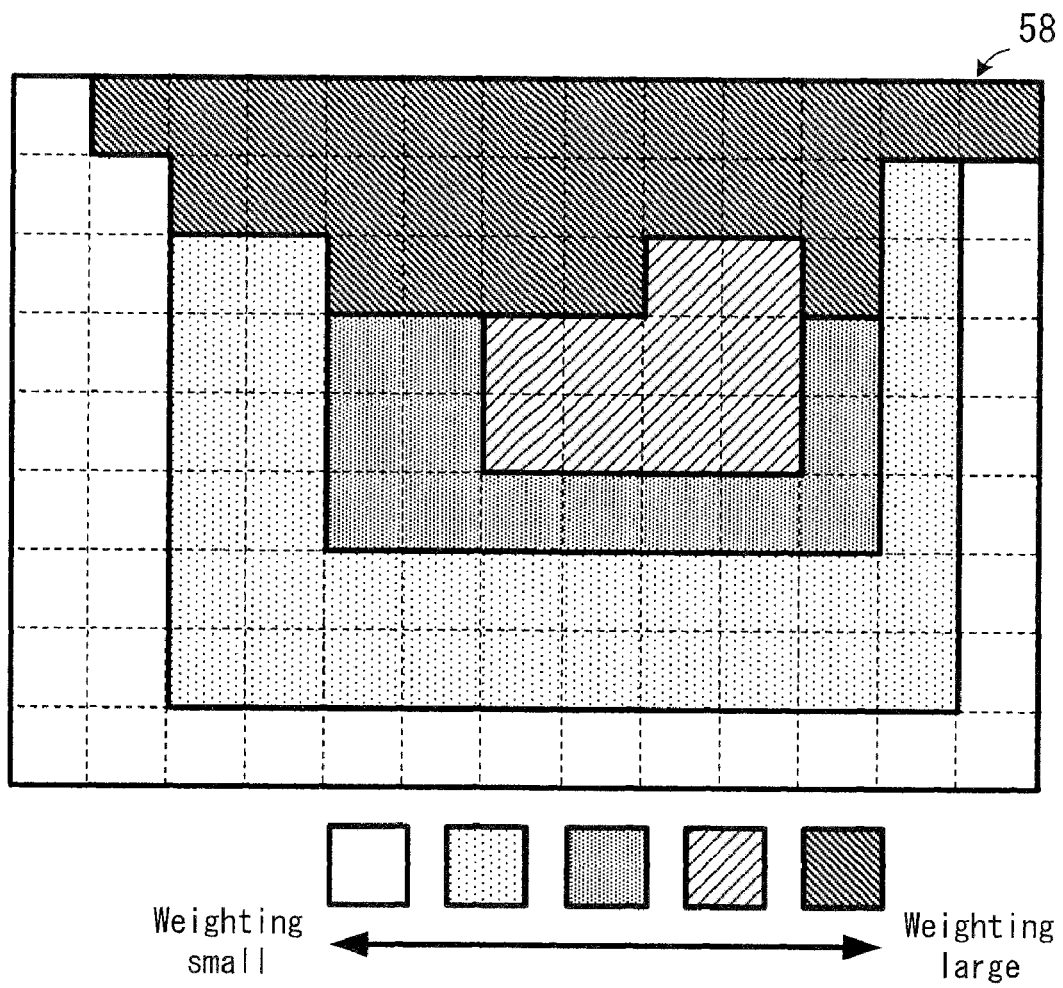

[FIG. 13]
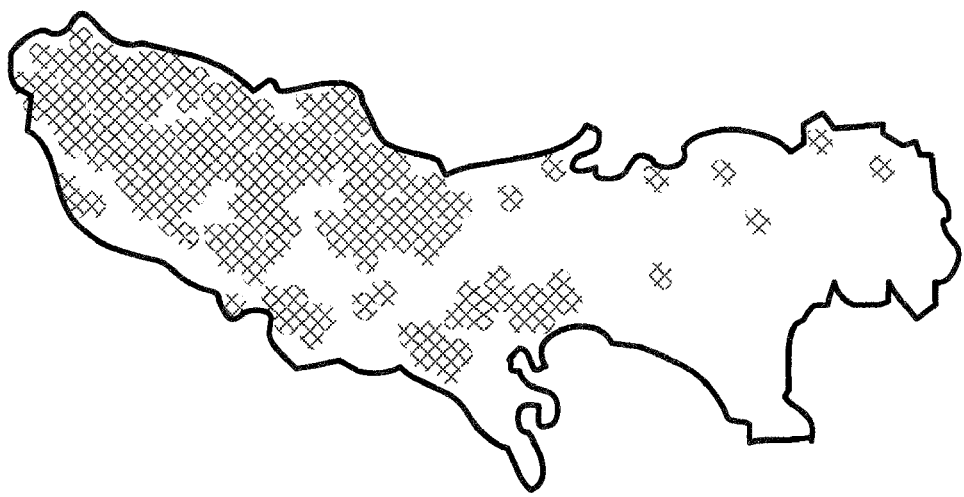
[FIG. 14]
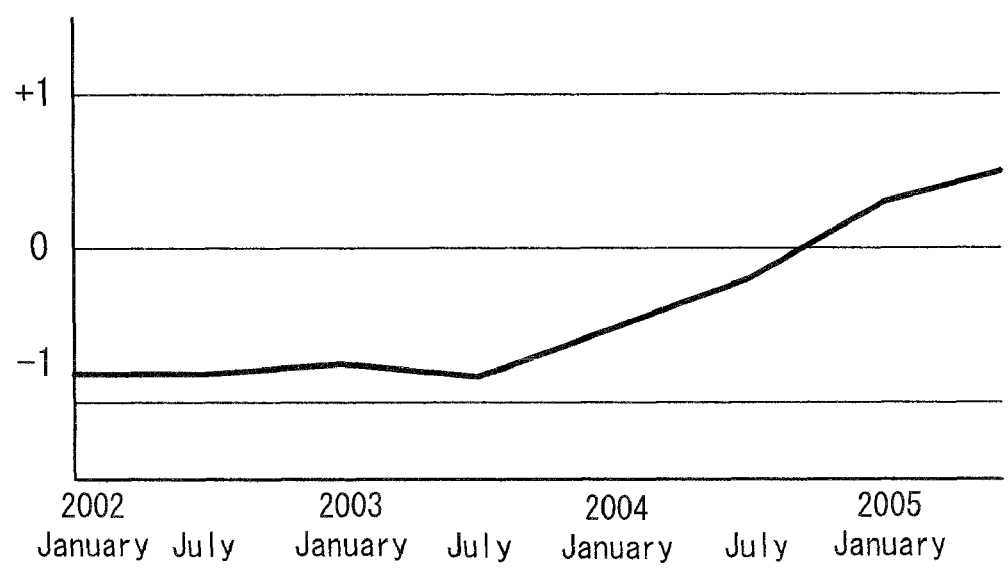

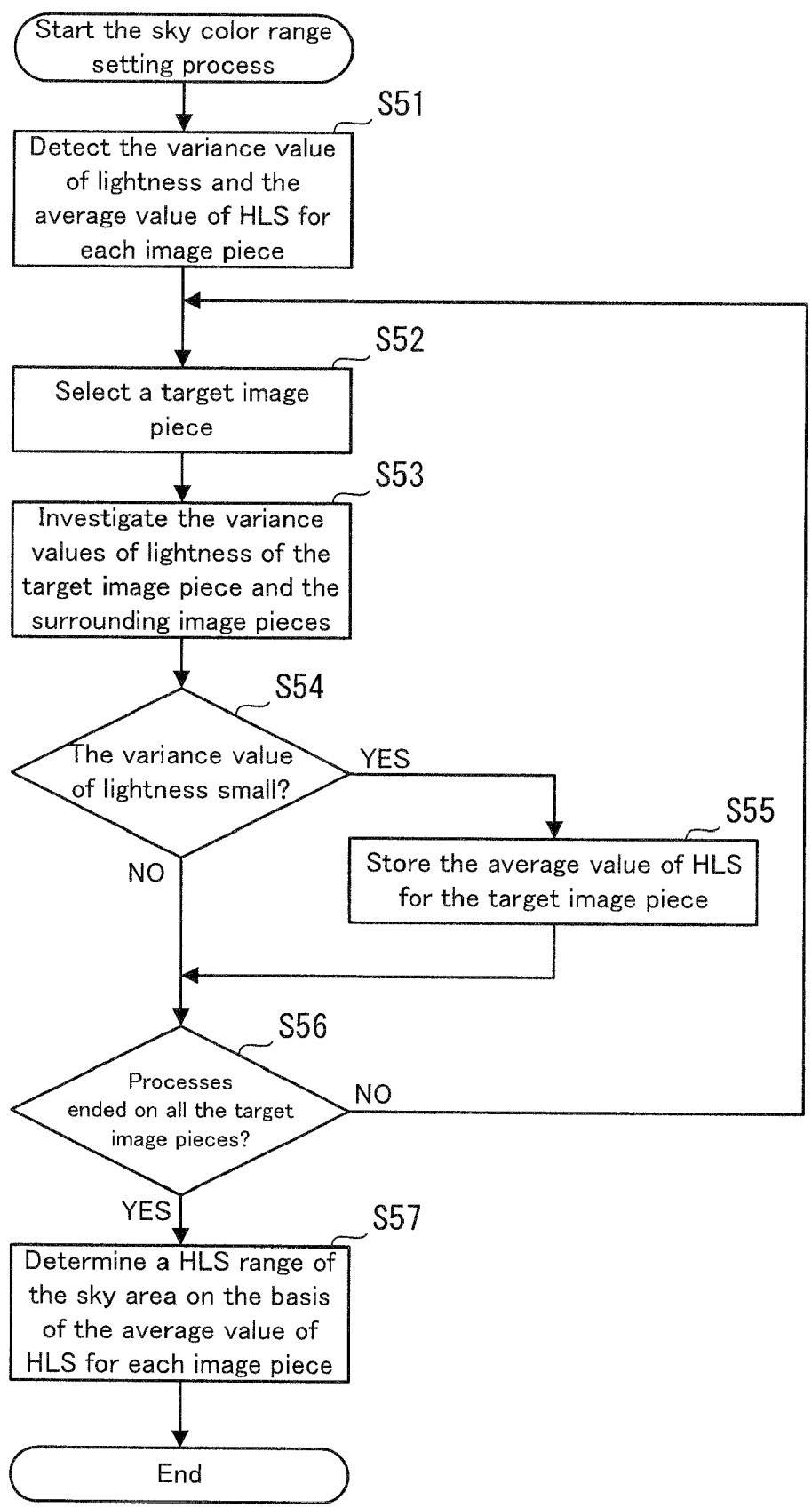
[FIG. 15]

IMAGE ANALYSIS DEVICE AND IMAGE ANALYSIS METHOD

TECHNICAL FIELD

The present invention relates to an image analyzing apparatus for and an image analyzing method of analyzing an image shot with a camera or the like to judge characteristics about the content of the image, such as an object and a scene included in the image.

BACKGROUND ART

There is known a technology of shooting the scene of a city, a rural village or the like with a camera or the like, analyzing the shot image of the scene, and determining a ratio of green in the scene. Such a technology may be used as means of evaluating the scene in a greening plan or urban plan by the government or local authorities.

Moreover, Japanese Patent Application Laid Open NO. Hei 8-16789 discloses a method of determining the percentage of color in the scene in the image.

Patent document 1: Japanese Patent Application Laid Open NO. Hei 8-16789

DISCLOSURE OF INVENTION

Subject to be Solved by the Invention

By the way, the image of the scene includes a wealth of information about the scene. It is meaningful when the accuracy of the image analysis on the scene can be improved by using the wealth of information. For example, if the image of the scene includes plants, sky, artifacts, and roads, it is meaningful when the image analysis makes it possible to recognize not only the amount of green but also the amount of artifacts, a ratio of green to artifacts, or the like, and when it is possible to automatically judge whether the scene is a natural scene or urban scene on the basis the analysis result.

However, such an image analysis and determination are not easy. For example, as described above, although Japanese Patent Application Laid Open NO. Hei 8-16789 discloses the method of determining the percentage of color in the scene in the image, this method alone hardly accurately judges whether the scene is a natural scene or urban scene. For example, the determination on color alone hardly accurately distinguishes between a natural object and an artifact having the same or similar color.

In order to solve the above-exemplified problem, it is therefore an object of the present invention to provide an image analyzing apparatus, an image analyzing method, and a computer program, which enable accurate judgment of the characteristics of the scene or object included in the image.

Means for Solving the Object

The above object of the present invention can be achieved by a first image analyzing apparatus provided with: an image obtaining device for obtaining an image; an image dividing device for dividing the image into a plurality of image pieces; a color analyzing device for analyzing a color property in each image piece; a fractal dimension analyzing device for performing a fractal dimension analysis in each image piece; a classifying device for specifying a type of an object, one portion of the object, one portion of a scene included in each image piece, on the basis of a color analysis result by the color analyzing device and a fractal dimension analysis result by the fractal dimension analyzing device, and classifying each image piece on the basis of the type; and a characteristic judging device for judging a characteristic of the entire object, an entire object aggregate, or the entire scene included in the image on the basis of a classification result by the classifying device.

The above object of the present invention can be also achieved by a second image analyzing apparatus provided with: an image obtaining device for obtaining an image; an image dividing device for dividing the image into a plurality of image pieces; a color analyzing device for analyzing a color property in each image piece; an artifact amount recognizing device for recognizing an amount of an artifact or an artificial portion included in each image piece; a classifying device for specifying a type of an object, one portion of the object, one portion of a scene included in each image piece, on the basis of a color analysis result by the color analyzing device and a recognition result of the amount of the artifact or the artificial portion by the artifact amount recognizing device, and classifying each image piece on the basis of the type; and a characteristic judging device for judging a characteristic of the entire object, an entire object aggregate, or the entire scene included in the image on the basis of a classification result by the classifying device.

The above object of the present invention can be also achieved by a third image analyzing apparatus provided with: an image obtaining device for obtaining an image; an image dividing device for dividing the image into a plurality of image pieces; a color analyzing device for analyzing a color property in each image piece; a fractal dimension analyzing device for performing a fractal dimension analysis in each image piece; an artifact amount recognizing device for recognizing an amount of an artifact or an artificial portion included in each image piece; a classifying device for specifying a type of an object, one portion of the object, one portion of a scene included in each image piece, on the basis of a color analysis result by the color analyzing device, a fractal dimension analysis result by the fractal dimension analyzing device, and a recognition result of the amount of the artifact or the artificial portion by the artifact amount recognizing device, and classifying each image piece on the basis of the type; and a characteristic judging device for judging a characteristic of the entire object, an entire object aggregate, or the entire scene included in the image on the basis of a classification result by the classifying device.

The above object of the present invention can be also achieved by a first image analyzing method provided with: an image obtaining process of obtaining an image; an image dividing process of dividing the image into a plurality of image pieces; a color analyzing process of analyzing a color property in each image piece; a fractal dimension analyzing process of performing a fractal dimension analysis in each image piece; a classifying process of specifying a type of an object, one portion of the object, one portion of a scene included in each image piece, on the basis of a color analysis result by the color analyzing process and a fractal dimension analysis result by the fractal dimension analyzing process, and classifying each image piece on the basis of the type; and a characteristic judging process of judging a characteristic of the entire object, an entire object aggregate, or the entire scene included in the image on the basis of a classification result by the classifying process.

The above object of the present invention can be also achieved by a second image analyzing method provided with: an image obtaining process of obtaining an image; an image dividing process of dividing the image into a plurality of image pieces; a color analyzing process of analyzing a color property in each image piece; an artifact amount recognizing process of recognizing an amount of an artifact or an artificial portion included in each image piece; a classifying process of specifying a type of an object, one portion of the object, one portion of a scene included in each image piece, on the basis of a color analysis result by the color analyzing process and a recognition result of the amount of the artifact or the artificial portion by the artifact amount recognizing process, and classifying each image piece on the basis of the type; and a characteristic judging process of judging a characteristic of the entire object, an entire object aggregate, or the entire scene included in the image on the basis of a classification result by the classifying process.

The above object of the present invention can be also achieved by a second image analyzing method provided with: an image obtaining process of obtaining an image; an image dividing process of dividing the image into a plurality of image pieces; a color analyzing process of analyzing a color property in each image piece; a fractal dimension analyzing process of performing a fractal dimension analysis in each image piece; an artifact amount recognizing process of recognizing an amount of an artifact or an artificial portion included in each image piece; a fractal dimension analyzing process of performing a fractal dimension analysis in each image piece; a classifying process of specifying a type of an object, one portion of the object, one portion of a scene included in each image piece, on the basis of a color analysis result by the color analyzing process, a fractal dimension analysis result by the fractal dimension analyzing process, and a recognition result of the amount of the artifact or the artificial portion by the artifact amount recognizing process, and classifying each image piece on the basis of the type; and a characteristic judging process of judging a characteristic of the entire object, an entire object aggregate, or the entire scene included in the image on the basis of a classification result by the classifying process.

The above object of the present invention can be also achieved by a computer program for making a computer function as the first, second, or third image analyzing apparatus of the present invention (including its various aspects).

The above object of the present invention can be also achieved by a computer program product in a computer-readable medium for tangibly embodying a program of instructions executable by a computer, to make the computer function as the first, second, or third image analyzing apparatus of the present invention (including its various aspects).

According to the computer program product of the present invention, the aforementioned first, second, or third image analyzing apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the aforementioned first, second, or third image analyzing apparatus of the present invention.

These effects and other advantages of the present invention will become more apparent from the following embodiments.

BRIEF DESCRIPTION OF DRAWINGS

FIG. 1 is a block diagram showing an embodiment of the image analyzing apparatus of the present invention.

FIG. 2 is a flowchart showing an operation of the image analyzing apparatus in FIG. 1.

FIG. 3 is a flowchart showing the content of an image obtaining process in FIG. 2.

FIG. 4 is an explanatory view showing an image obtained by camera shooting.

FIG. 5 is an explanatory view showing that the image in FIG. 4 is divided into image pieces.

FIG. 6 is a flowchart showing the content of a color analysis process in FIG. 2.

FIG. 7 is a flowchart showing an artifact amount recognition process in FIG. 2.

FIG. 8 is an explanatory view showing that vertical edge components are extracted from the image piece by the artifact amount recognition process in FIG. 7.

FIG. 9 is an explanatory view showing a classification condition used in a classification process in FIG. 2.

FIG. 10 is an explanatory view showing a result of the classification by the classification process.

FIG. 11 is an explanatory view showing an image shot immediately after the image in FIG. 4 is shot.

FIG. 12 is an explanatory view showing the image piece with weight depending on a distance between scene or the like and a camera.

FIG. 13 is a nature distribution map in a particular area made by using the degree of nature and position information obtained by the image analyzing apparatus of the present invention.

FIG. 14 is a graph showing a temporal change in the extent of urbanization in a particular place, made by using the degree of urbanization and time information obtained by the image analyzing apparatus of the present invention.

FIG. 15 is a flowchart showing the content of a sky-blue range setting process.

DESCRIPTION OF REFERENCE CODES 1 mage analyzing apparatus
11 camera
12 input device
13 image division device
14 color analysis device
15 fractal dimension analysis device
16 artifact amount recognition device
17 classification device
18 characteristic judgment device
19 distance recognition device
20 obstacle recognition device
21 position information generation device
24 memory apparatus

BEST MODE FOR CARRYING OUT THE INVENTION

Hereinafter, the best mode for carrying out the present invention will be explained in each embodiment in order with reference to the drawings.

(Structure of Image Analyzing Apparatus)

FIG. 1 shows the structure of the image analyzing apparatus of the present invention. An image analyzing apparatus 1 in FIG. 1 is provided with functions of obtaining image data by shooting a scene, an object, or an object aggregate (hereinafter referred to as a "scene or the like"), analyzing an image corresponding to the image data, and judging characteristics of the scene or the like included in the image. The characteristics of the scene or the like included in the image are, for example, a nature level, an urban level, and the like. The rough meanings of the nature level and the urban level are as follows. That is, the nature level means the extent of preservation of nature without human tampering with nature. The urban level means the extent of development or maturity as cities, housing lands, business districts, industrial districts, or the like, with human tampering with nature.

According to the image analyzing apparatus 1, it is possible to know the nature level, the urban level, or the like in a place where the shooting is performed. By studying the nature level, the urban level, or the like in various places by using the image analyzing apparatus 1, it is possible to efficiently and highly accurately perform e.g. investigation of nature distribution, green space distribution, city distribution, fall foliage distribution or the like, preparation of a nature distribution map, a green space distribution map, a city distribution map, a fall foliage distribution map, a map or the like, and scene evaluation in a landscape plan or the like.

The image analyzing apparatus 1 is desirably mounted on a movable body or a mobile object. For example, the image analyzing apparatus 1 may be incorporated or built in a car navigation system and is mounted on a vehicle. Alternatively, of the constituent elements of the image analyzing apparatus 1, only a camera may be mounted on the movable body, and the other constituent elements may be located in companies, laboratories, observation offices, or rooms at home. In this case, the camera and the structural object provided in the room are connected by wireless communication.

As shown in FIG. 1, the image analyzing apparatus 1 is provided with: a camera 11; an input device 12; an image division device 13; a color analysis device 14; a fractal dimension analysis device 15; an artifact amount recognition device 16; a classification device 17; a characteristic judgment device 18; a distance recognition device 19; an obstacle recognition device 20; a position information generation device 21; a time information generation device 22; a GPS (Global Positioning System) reception device 23; a memory apparatus 24; and a control device 25.

The camera 11 shoots, for example, the scene or the like ahead in a traveling direction of the movable body. The camera 11 is desirably mounted on the front side in the travelling direction of the movable body to shoot forward in the traveling direction of the movable body. For example, the camera 11 is desirably mounted in the vicinity of an automobile front bumper, front glass, or the like. The camera 11 may be a digital camera or analog camera. Moreover, the camera 11 may be a camera for taking a picture (still image), or a camera for shooting video (motion picture), i.e. a video camera.

The input device 12 generates the image data on the basis of the still image data or the motion picture data outputted from the camera 11. The input device 12 is provided, for example, with an input interface circuit, a control apparatus for image processing, an arithmetic apparatus or the like. Incidentally, the input device 12 may be provided with an external input terminal 26 to connect an image input apparatus other than the camera 11, so that the image data can be generated on the basis of the still image data and the motion picture data outputted from the image input apparatus other than the camera 11. Moreover, if the camera 11 is an analog camera, the input device 12 is provided with a D/A converter (Digital/Analog converter) for converting an analog still signal or motion picture signal to a digital still signal or motion picture signal.

The image division device 13 divides the image corresponding to the image data, into a plurality of image pieces.

The color analysis device 14 analyzes a color property in each image piece.

The fractal dimension analysis device 15 performs a fractal dimension analysis in each image piece.

The artifact amount recognition device 16 recognizes the amount of artifacts or an artificial portion included in each image piece.

The classification device 17 specifies the type of one portion of the scene or the like included in each image piece, on the basis of the color analysis result by the color analysis device 14 and the fractal dimension analysis result by the fractal dimension analysis device 15, and it classifies each image piece on the basis of the type. Incidentally, if what is shown on the entire image corresponding to the image data is one scene or the like, then what is shown in each image piece obtained by dividing the image corresponding to the image data corresponds to one portion of the scene or the like. The "one portion of the scene or the like" has the above meaning.

The characteristic judgment device 18 judges the characteristic of the entire scene or the like included in the image corresponding to the image data on the basis of the classification result by the classification device 17.

The distance recognition device 19 recognizes the distance between the camera 11 and one portion of the scene or the like included in the image piece.

The obstacle recognition device 20 recognizes that an obstacle is approaching the camera 11 and the obstacle is blocking between the camera 11 and the scene or the like which is a shooting target.

The position information generation device 21 generates position information which indicates a shooting position of the camera 11.

The time information generation device 22 generates time information which indicates a shooting year, month, date, and time point of the camera 11.

The image division device 13, the color analysis device 14, the fractal dimension device 15, the artifact amount recognition device 16, the classification device 17, the characteristic judgment device 18, the distance recognition device 19, the obstacle recognition device 20, the position information generation device 21, and the time information generation device 22 are formed of a central processing unit, a multiprocessor, or a micro computer or the like.

The GPS reception device 23 obtains, from GPS satellites, information which indicates longitude, latitude, and altitude corresponding to a current position of the movable body, and provides this for the position information generation device 21. The GPS reception device 23 is provided, for example, with a GPS receiving apparatus. Incidentally, the information, which is provided by the GPS reception device 23 and which indicates longitude, latitude, and altitude, may be corrected by autonomous navigation or map matching to improve the accuracy (or consistency of the current position of the movable body) of the information which indicates longitude, latitude, and altitude. In this case, vehicle-speed information obtained from a speed sensor mounted on the movable body, orientation information obtained from a gyro, and map information stored in the memory apparatus 24 or the like are used. Moreover, the GPS reception device 23 obtains, from GPS satellites, information which indicates a current year, month, date, and time point and provides this for the time information generation device 22.

The memory apparatus 24 is provided with a work area for performing a process by each constituent element of the image analyzing apparatus 1. The work area is used for, for example, an image data extraction process by the input device 12, an image division process by the image division device 13, a color analysis process by the color analysis device 14, a fractal dimension analysis process by the fractal dimension analysis device 15, an artifact amount recognition process by the artifact amount recognition device 16, a classification process by the classification device 17, a characteristic judgment process by the characteristic judgment device 18, a distance recognition process by the distance recognition device 19, an obstacle recognition process by the obstacle recognition device 20, or the like. Moreover, the memory apparatus 24 has a data storage area. In the data storage area, there are stored classification condition information used for the classification process by the classification device 17, a characteristic judgment equation used for the characteristic judgment process by the characteristic judgment device 18, map information, and the like.

The control device 25 controls the operation of each of the constituent elements 11 to 24 of the image analyzing apparatus 1.

(Operation of Image Analyzing Apparatus)

FIG. 2 shows the operation of the image analyzing apparatus 1. The image analyzing apparatus 1 desirably periodically repeats a series of operations from a step S1 to a step S9 in FIG. 2 while the movable body travels. That is, the image analyzing apparatus 1 desirably performs the operations shown in FIG. 2 in each predetermined travel time of the movable body or each predetermined travel distance. For example, the image analyzing apparatus 1 performs the operations shown in FIG. 2 every about 5 to 30 seconds, or every time the movable body travels about 0.5 to 4 km. Incidentally, the interval that the image analyzing apparatus 1 performs the operations shown in FIG. 2 is desirably determined in view of the extent that the scene or the like shot with the camera 11 changes along with the travel of the movable body. For example, if a target to be shot with the camera 11 is a distant scene, there is a small and slow change in the scene with the travel of the movable body. In this case, the interval of the operations shown in FIG. 2 may be set long. Moreover, the interval that the image analyzing apparatus 1 performs the operations shown in FIG. 2 may be changed depending on a traveling speed of the movable body.

(Image Obtaining Process)

In the operations shown in FIG. 2, firstly, the image analyzing apparatus 1 performs an image obtaining process (step S1). The image obtaining process is mainly a process of shooting the scene or the like with the camera 11 and storing the image data in which the image including the shot scene or the like is coded.

FIG. 3 shows the content of the image obtaining process. In FIG. 3, the image analyzing apparatus 1 firstly shoots the scene or the like with the camera 11 (step S21). That is, the camera 11 shoots the scene or the like ahead in the traveling direction of the movable body, and inputs the still image data or motion picture data in which the image of the scene or the like is coded, to the input device 12. The input device 12 obtains the still image data or motion picture data outputted from the camera 11, and generates the image data on the basis of this. In short, if the data outputted from the camera 11 is the still image data, the input device 12 obtains the still image data and simply outputs this as the image data to the work area of the memory apparatus 24. On the other hand, if the data outputted from the camera 11 is the motion picture data, the input device 12 obtains the motion picture data, extracts one frame of data from the motion picture data, and outputs this as the image data to the work area of the memory apparatus 24. An image 51 in FIG. 4 shows one example of the image corresponding to the image data.

Incidentally, as a general rule, the shooting of the scene or the like with the camera 11 is performed every time the operations shown in FIG. 2 are repeated at predetermined intervals. That is, as a general rule, the shooting of the scene or the like with the camera 11 is performed in each predetermined travel distance of the movable body or each predetermined travel time. For example, if the camera 11 is a camera for taking a picture, a shutter is clicked at predetermined intervals. On the other hand, if the camera 11 is a video camera, the shooting with the camera 11 is always continued during the travel of the movable body. Then, from the motion picture data obtained by this, one frame of data is extracted by the input device 12 at predetermined intervals.

Then, the image analyzing apparatus 1 stores the image data obtained by the shooting to the work area of the memory apparatus 24 (step S22).

Then, the image analyzing apparatus 1 judges whether or not the scene or the like is appropriately shot with the camera 11, i.e. whether or not the image of the scene or the like is appropriately included in the image corresponding to the image data. This judgment is performed by the obstacle recognition device 20. That is, the obstacle recognition device 20 recognizes whether or not an obstacle is approaching the camera 11 and the obstacle is blocking between the camera 11 and the scene or the like which is a shooting target (step S23). Specifically, the obstacle recognition device 20 investigates the color or the like of the image corresponding to the image data, specifies an object included in the image, and investigates the percentage of the object in the image. Then, if the percentage of the object in the image is beyond a predetermined percentage, the obstacle recognition device 20 recognizes that an obstacle is approaching the camera 11 and the obstacle is blocking between the camera 11 and the scene or the like which is a shooting target. For example, if an automobile equipped with the camera 11 drives immediately after a bus, a truck, or the like, a view ahead in the traveling direction of the automobile is blocked by the rear surface of the bus or the truck. If the shooting is performed in this circumstance, the image corresponding to the image data entirely shows the rear surface of the bus or the truck. In this case, the obstacle recognition device 20 recognizes that an obstacle is approaching the camera 11 and the obstacle is blocking between the camera 11 and the scene or the like which is a shooting target.

If the obstacle is blocking between the camera 11 and the scene or the like which is a shooting target (the step S23: YES), the image analyzing apparatus 1 shoots the scene or the like again, and stores the image data obtained by this time's shooting into the work area of the memory apparatus 24 instead of the image data obtained by the previous shooting.

If the obstacle is not blocking between the camera 11 and the scene or the like which is a shooting target and if the scene or the like is appropriately shot with the camera 11 (the step S23: NO), the image analyzing apparatus 1 generates the position information which indicates the shooting position of the camera 11, and stores this into the work area of the memory apparatus 24 (step S24). The position information is generated by the position information generation device 21. That is, the position information generation device 21 receives, from the GPS reception device 23, the information which indicates longitude, latitude, and altitude corresponding to the position of the movable body when the shooting is performed by the camera 11, and generates the position information on the basis of the above information.

Then, the image analyzing apparatus 1 generates the time information which indicates the shooting year, month, date, and time point of the camera 11, and stores this into the work area of the memory apparatus 24 (step S25). The time information is generated by the time information generation device 22. That is, the time information generation device 22 receives, from the GPS reception device 23, the information which indicates the shooting year, month, date, and time point of the camera 11 when the shooting is performed by the camera 11, and generates the time information on the basis of the above information. Incidentally, a clock may be provided and used to generate the time information.

The image data, the position information, and the time information obtained by the image obtaining process are stored into the work area of the memory apparatus 24 in association with each other.

(Image Division Process)

Back in FIG. 2, the image analyzing apparatus 1 performs an image division process following the image obtaining process (step S2). The image division process is a process of dividing the image corresponding to the image data obtained by the image obtaining process, into a plurality of image pieces. The image division process is performed by the image division device 13. That is, the image division device 13 divides the image corresponding to the image data stored in the work area of the memory apparatus 24, into a plurality of image pieces, and stores image piece data corresponding to each image piece into the work area of the memory apparatus 24. For example, if the size of the image corresponding to the image data is 1280×1024 pixels, the size of the image piece is desirably about 30×30 pixels. Incidentally, the size of the image piece is desirably determined in view of the accuracy and processing speed of the color analysis process, the fractal dimension analysis process, the artifact amount recognition process, the characteristic judgment process, or the like.

Moreover, depending on the relationship between the size of the image piece and the size of the image corresponding to the image data, the entire image cannot be divided into unique image pieces in some cases. In this case, the edge portion of the image corresponding to the image data may be removed from a target of the image division process.

An image 52 in FIG. 5 shows that the image 51 in FIG. 4 is divided into a plurality of image pieces 53 by the image division process.

(Color Analysis Process)

Back in FIG. 2, the image analyzing apparatus 1 performs the color analysis process, the fractal dimension analysis process, and the artifact amount recognition process, following the image division process (step S3 to step S5). The color analysis process, the fractal dimension analysis process, and the artifact amount recognition process are performed on each image piece. For example, the color analysis process, the fractal dimension analysis process, and the artifact amount recognition process are performed on one image piece, and after that, the fractal dimension analysis process, and the artifact amount recognition process are performed on a nest image piece. Then, such processes are repeated on all the image pieces which constitute the image corresponding to the image data. Incidentally, the order of the color analysis process, the fractal dimension analysis process, and the artifact amount recognition process is not limited to that shown in FIG. 2. For example, the order may be the fractal dimension analysis process, the artifact amount recognition process, the color analysis process. Moreover, the color analysis process may be performed on all the image pieces which constitute the image corresponding to the image data, and then, the fractal dimension analysis process may be performed on all the image pieces which constitute the image corresponding to the image data, and then, the artifact amount recognition process may be performed on all the image pieces which constitute the image corresponding to the image data.

According to the example shown in FIG. 2, firstly, the image analyzing apparatus 1 performs the color analysis process on one image piece. FIG. 6 shows the content of the color analysis process. The color analysis process is a process of analyzing a color property in each image piece. The color analysis process is performed on each pixel in the image piece.

In FIG. 6, firstly, if color information about the image piece data is RGB-system color information, the color analysis device 14 converts this color information to color-system color information using hue, lightness, and saturation as parameters, e.g. HLS-system color information (step S31).

Then, the color analysis device 14 selects one pixel on which the color analysis process has not been performed, from among the pixels included in the image piece (step S32).

Then, the color analysis device 14 judges whether or not the selected pixel satisfies a sign reference (sign judgment: step S33). That is, the color analysis device 14 judges that the pixel satisfies a sign reference when the saturation of the color of the pixel exceeds a predetermined saturation reference value and the lightness of the color of the pixel exceeds a predetermined lightness reference value. This judgment is performed on the basis of the HLS-system color information about the pixel. If the pixel satisfies a sign reference (the step S33: YES), the color analysis device 14 increases a sign count value (step S34). After that, the color analysis device 14 does not perform the judgment of a green reference and the judgment of a blue-sky reference (steps S35 and 37) and shifts the process to a step S39.

If the pixel does not satisfy a sign reference (the step S33: NO), the color analysis device 14 does not increase the sign count value. Then, the color analysis device 14 judges whether or not the pixel satisfies a green reference (green judgment: step S35). That is, the color analysis device 14 judges that the pixel satisfies a green reference when the hue of the pixel is a green area. This judgment is performed on the basis of the HLS-system color information about the pixel. If the pixel satisfies a green reference (the step S35: YES), the color analysis device 14 increases a green count value (step S36). After that, the color analysis device 14 does not perform the judgment of a blue-sky reference (step S37) and shifts the process to a step S39.

If the pixel does not satisfy a green reference (the step S35: NO), the color analysis device 14 does not increase the green count value. Then, the color analysis device 14 judges whether or not the pixel satisfies a blue-sky reference (blue-sky judgment: step S37). That is, the color analysis device 14 judges that the pixel satisfies a blue-sky reference when the hue of the pixel is a blue area. This judgment is performed on the basis of the HLS-system color information about the pixel. If the pixel satisfies a blue-sky reference (the step S37: YES), the color analysis device 14 increases a blue-sky count value (step S38).

If the pixel does not satisfy a blue-sky reference (the step S37: NO), the color analysis device 14 does not increase the blue-sky count value.

Then, in a step S39, the color analysis device 14 judges whether or not the sign judgment, the green judgment and the blue-sky judgment of all the pixels included in the image piece are performed in accordance with the flow from the step S33 to the step S38. If the sign judgment, the green judgment and the blue-sky judgment of all the pixels included in the image piece are not performed in accordance with the flow from the step S33 to the step S38 (the step S39: NO), the color analysis device 14 returns the process to the step S32, selects an unprocessed pixel (e.g. next pixel), and performs the sign judgment, the green judgment and the blue-sky judgment of the pixel in accordance with the flow from the step S33 to the step S38.

If the sign judgment, the green judgment and the blue-sky judgment of all the pixels included in the image piece are performed in accordance with the flow from the step S33 to the step S38 (the step S39: YES), then, the color analysis device 14 calculates a sign ratio, a green ratio, and a blue-sky ratio (step S40). That is, the color analysis device 14 calculates the sign ratio by dividing the sign count value by the number of the pixels in the image piece. Moreover, the color analysis device 14 calculates the green ratio by dividing the green count value by the number of the pixels in the image piece. Moreover, the color analysis device 14 calculates the blue-sky ratio by dividing the blue-sky count value by the number of the pixels in the image piece. The calculated sign ratio, green ratio, and blue-sky ratio are stored into the work area of the memory apparatus 24.

Incidentally, a counter for performing sign count, green count, and blue-sky count is provided, for example, for the color analysis device 14. Moreover, the sign count value, the green count value, and the blue-sky count value are cleared immediate before the color analysis process is performed on each image piece.

(Fractal Dimension Analysis Process)

Back in FIG. 2, the image analyzing apparatus 1 performs the fractal dimension analysis process on the same image piece, following the color analysis process (step S4). The fractal dimension analysis process is a process of performing the fractal dimension analysis on each image piece. The fractal dimension analysis process is performed by the fractal dimension analysis device 15. The fractal dimension analysis process provides a fractal dimension value for the image piece. The fractal dimension value is any value of 0.0 to 2.0, for example. The fractal dimension value is stored into the work area of the memory apparatus 24. Incidentally, the fractal dimension analysis process can use a known fractal dimension analyzing method.

(Artifact Amount Recognition Process)

The image analyzing apparatus 1 performs the artifact amount recognition process on the same image piece, following the fractal dimension analysis process (step S5). FIG. 7 shows the artifact amount recognition process. The artifact amount recognition process is a process of recognizing the amount of artifacts or an artificial portion included in each image piece. The artifact amount recognition process is performed by the artifact amount recognition device 16.

As shown in FIG. 7, the artifact amount recognition device 16 extracts edge components which extend in a longitudinal direction in the image piece, i.e. vertical edge components (step S41). For example, the lower side of the image piece matches the horizon in the shot scene or the like, the vertical edge component is an edge component which extends in a direction of perpendicularly crossing the lower side of the image piece.

Then, the artifact amount recognition device 16 binarizes the extracted vertical edge components (step S42).

Then, the artifact amount recognition device 16 counts the vertical edge components with a predetermined length or more which continuously extend (step S43). For example, the artifact amount recognition device 16 counts the number of the vertical edge components that continuously extend from the lower edge to the upper edge of the image piece. FIG. 8 shows the vertical edge components in one image piece 54. The image piece shown in FIG. 8 has three vertical edge components 55 which continuously extend from the lower edge to the upper edge of the image piece.

In general, although the artifact, such as a sign and a building, extends straight in a vertical direction from a horizontal ground, a natural object, such as a plant, does not in many cases. Thus, by counting the vertical edge components with the predetermined length or more which continuously extend in one image piece, it is possible to know the amount of the artifacts included in one image piece.

A value that indicates the number of the vertical edge components with the predetermined length or more which continuously extend in one image piece is stored into the work area of the memory apparatus 24 as an artifact amount count value.

Back in FIG. 2, after finishing the color analysis process, the fractal dimension analysis process, and the artifact amount recognition process on one image piece, the image analyzing apparatus 1 judges whether or not the color analysis process, the fractal dimension analysis process, and the artifact amount recognition process are ended on all the image pieces which constitute the image corresponding to the image data (step S6). If the color analysis process, the fractal dimension analysis process, and the artifact amount recognition process are not ended on all the image pieces which constitute the image corresponding to the image data, the image analyzing apparatus 1 performs the color analysis process, the fractal dimension analysis process, and the artifact amount recognition process on an unprocessed image piece (next image piece).

(Classification Process)

On the other hand, if the color analysis process, the fractal dimension analysis process, and the artifact amount recognition process are ended on all the image pieces which constitute the image corresponding to the image data, the image analyzing apparatus 1 performs the classification process (step S7). The classification process is a process of specifying the type of one portion of the scene or the like included in each image piece on the basis of the color analysis result (the sign ratio, green ratio, and blue-sky ratio) obtained by the color analysis process, the fractal dimension analysis result (the fractal dimension analysis value) obtained by the fractal dimension analysis process, and the recognition result (the artifact amount count value) of the amount of the artifacts or artificial portion obtained by the artifact amount recognition process, and of classifying each image piece on the basis of the type. The type of one portion of the scene or the like includes, for example, a plant, sky, artifact, or the like. In accordance with these, classification items, such as "plant", "sky", "artifact", and "others", are set. The classification process is performed by the classification device 17. The classification process uses, for example, classification conditions described in classification condition information 55 as shown in FIG. 9. The classification condition information 55 is prepared in advance on the basis of experiments or the like before product shipment, and it is stored in the data storage area of the memory apparatus 24. Incidentally, it may be also constructed such that the classification condition information 55 can be updated.

Hereinafter, a specific example of the classification process is illustrated. In this specific example, each image piece included in one image data is classified by using the classification conditions described in the classification condition information 55 shown in FIG. 9. Firstly, the classification device 17 reads the classification condition information 55 from the data storage area of the memory apparatus 24. Then, the classification device 17 reads the sign ratio, the green ratio, the blue-sky ratio, the fractal dimension analysis value, and the artifact amount count value about one of the image pieces included in the image data, from the work area of the memory apparatus 24. Then, the classification device 17 compares a combination of the sign ratio, the green ratio, the blue-sky ratio, the fractal dimension analysis value, and the artifact amount count value about the image piece with the classification conditions described in the classification condition information 55. Then, the classification device 17 judges whether or not the combination of the sign ratio, the green ratio, the blue-sky ratio, the fractal dimension analysis value, and the artifact amount count value about the image piece is applicable to the classification conditions. Then, the classification device 17 specifies the type of one portion of the scene or the like included in the image piece on the basis of the judgment result, and classifies the image piece on the basis of the type.

For example, if the green ratio about the image piece is high (e.g. more than 0.5), the blue-sky ratio is low (e.g. 0.5 or less), the sign ratio is low (e.g. 0.5 or less), the fractal dimension analysis value is high (e.g. more than 1.0), and the artifact amount count value is 0, then the type of one portion of the scene or the like included in the image piece is specified to be the plant, and the image piece is classified into the classification item of "plant".

Moreover, if the green ratio about the image piece is low (e.g. 0.5 or less), the blue-sky ratio is high (e.g. more than 0.5), the sign ratio is low (e.g. 0.5 or less), the fractal dimension analysis value is low (e.g. 1.0 or less), and the artifact amount count value is 0, then the type of one portion of the scene or the like included in the image piece is specified to be the sky, and the image piece is classified into the classification item of "sky".

Moreover, if the green ratio about the image piece is low (e.g. 0.5 or less), the blue-sky ratio is low (e.g. 0.5 or less), and the sign ratio is high (e.g. more than 0.5), then the type of one portion of the scene or the like included in the image piece is specified to be the artifact, and the image piece is classified into the classification item of "artifact". Moreover, if the green ratio about the image piece is low (e.g. 0.5 or less), the blue-sky ratio is low (e.g. 0.5 or less), and the artifact amount count value is 1 or more, then the type of one portion of the scene or the like included in the image piece is also specified to be the artifact, and the image piece is classified into the classification item of "artifact".

Moreover, if the combination of the sign ratio, the green ratio, the blue-sky ratio, the fractal dimension analysis value, and the artifact amount count value about the image piece is not applicable to any one of the classification conditions, the image piece is classified into the classification item of "others".

The classification result by the classification process is stored into the work area of the memory apparatus 24. For example, the classification result may be replaced by a classification number and is stored, like a classification number 1 if the classification result is "plant", a classification number 2 if "sky", a classification number 3 if "artifact", and a classification number 4 if "others".

An image chart 56 in FIG. 10 displays the classification result of each image piece obtained by the classification process, with a different color for each classification result. This is the result that each image piece 53 in the image 52 shown in FIG. 5 is classified by suing the classification condition information 55 shown in FIG. 9. By comparing the image 52 in FIG. 5 with the image chart 56 in FIG. 10, it is found that the actual scene or the like shown in the image 52 matches the classification result displayed in the image chart 56. For example, trees are shown on the left side of the image 52, and the classification result of "plant" is displayed on the left side of the image chart 56. Moreover, the sky is shown on the upper side of the image 52, and the classification result of "sky" is displayed on the upper side of the image chart 56. Moreover, buildings are shown on the right side of the image 52, and the classification result of "artifact" is displayed on the right side of the image 52. Moreover, a road is shown on the lower side of the image 52. The road is judged neither the plant, nor the sky, nor the artifact, so the classification result of "others" is displayed on the lower side of the image chart 56.

(Characteristic Judgment Process)

Back in FIG. 2, then the image analyzing apparatus 1 performs the characteristic judgment process (step S8). The characteristic judgment process is a process of judging the characteristic of the entire scene or the like included in the image corresponding to the image data, on the basis of the classification result obtained by the classification process. The characteristic of the entire scene or the like includes, for example, a nature level, an urban level, or the like. The characteristic judgment process is performed by the characteristic judgment device 18. Moreover, the characteristic judgment process uses a characteristic judgment equation. The characteristic judgment equation is prepared in advance on the basis of experiments or the like before product shipment, and it is stored in the data storage area of the memory apparatus 24. Incidentally, it may be also constructed such that the characteristic judgment equation can be changed.

In the characteristic judgment process, the characteristic judgment device 18 firstly totalizes the classification results about the image pieces which constitute the image corresponding to one image data. For example, of the image pieces which constitute the image corresponding to one image data, the number of image pieces with the classification result of "plant", the number of image pieces with the classification result of "sky", the number of image pieces with the classification result of "artifact", and the number of image pieces with the classification result of "others" are counted. Referring to the case that the classification result about each image piece is as shown in the image chart 56 in FIG. 10, the number of image pieces with the classification result of "plant" is 30. The number of image pieces with the classification result of "sky" is 28. The number of image pieces with the classification result of "artifact" is 20. The number of image pieces with the classification result of "others" is 30. Then, the characteristic judgment device 18 stores the totalized classification results into the work area of the memory apparatus 24.

Then, the characteristic judgment device 18 reads the characteristic judgment equation from the data storage area of the memory apparatus 24. The characteristic judgment equation is an equation for judging the characteristic of the scene or the like included in the image. The characteristic judgment equation exists for each type of the scene or the like included in the image, i.e. the nature level, the urban level, or the like. Here, the characteristic judgment equation for judging the nature level is referred to as a nature level judgment equation, and the characteristic judgment equation for judging the urban level is referred to as an urban level judgment equation.

There are various characteristic judgment equations, such as the nature level judgment equation and the urban level judgment equation, depending on the type of the characteristic of the scene or the like included in the image. Each of these equations, however, has the common structure. That is, there is a basic equation for the characteristic judgment equation, and what embody the basic equation are the nature level judgment equation and the urban level judgment equation. The basic equation of the characteristic judgment equation is as follows.

$$\text{Characteristic of the scene or the like} = \frac{\text{(the number of plus elements} - \text{the number of minus elements)}}{\text{the total number of judgment elements}} \quad (1)$$

In the equation (1), the number of plus elements is the number of image pieces with the classification result that acts to emphasis the characteristic of the scene or the like which is a characteristic judgment target. The number of minus elements is the number of image pieces with the classification result that acts to weaken the characteristic of the scene or the like which is a characteristic judgment target. The total number of judgment elements is the total number of image pieces with the classification result that is used for the characteristic judgment.

In the case of the judgment of the nature level, the number of the image pieces with the classification result of "plant" (the number of plants) is the number of plus elements, and the number of the image pieces with the classification result of "artifact" (the number of artifacts) is the number of minus elements. Moreover, the classification result used for the judgment of the nature level is "plant", "sky", and "artifact". Thus, the total number of judgment elements is a sum of the number of the image pieces with the classification result of "plant", the number of the image pieces with the classification result of "sky" (the number of sky), and the number of the image pieces with the classification result of "artifact". Incidentally, the number of the image pieces with the classification result of "sky" is neither the number of plus elements nor the number of minus elements; however, it is included in the total number of judgment elements. That is, the nature level judgment equation is, for example, as follows.

Nature level=(the number of plants−the number of artifacts)/the total number of judgment elements (2)

Incidentally, the total number of judgment elements=the number of plants+the number of sky+the number of artifacts (3)

The value of the nature level is any value of −1 to 1. If the nature level is the lowest, it is −1. If the nature level is the highest, it is +1. For example, if the nature level of the image 52 in FIG. 5 is calculated on the basis of the classification result of each image piece shown in the image chart 56 in FIG. 10, it is as follows. That is, in the image chart 56, the number of plants is 30, the number of sky is 28, and the number of artifacts is 20, so that the nature level is (30−20)/78=0.13 (4).

A nature level of 0 is the intermediate value of the nature level. So if it is evaluated "to appropriately have nature" when the nature level is 0, then a nature level of 0.13 can be evaluated "to appropriately have nature", for example.

Moreover, in the case of the judgment of the urban level, the number of the image pieces with the classification result of "artifact" is the number of plus elements. The number of the image pieces with the classification result of "plant" and the number of the image pieces with the classification result of "sky" are the number of minus elements. Moreover, the classification result used for the judgment of the urban level is "plant", "sky", and "artifact". Thus, the total number of judgment elements is a sum of the number of the image pieces with the classification result of "plant", the number of the image pieces with the classification result of "sky", and the number of the image pieces with the classification result of "artifact". That is, the urban level judgment equation is, for example, as follows.

Urban level={the number of artifacts−(the number of plants+the number of sky)/the total number of judgment elements (5)

Incidentally, the total number of judgment elements=the number of plants+the number of sky+the number of artifacts (6)

The value of the urban level is any value of −1 to 1. If the urban level is the lowest, it is −1. If the urban level is the highest, it is +1. For example, if the urban level of the image 52 in FIG. 5 is calculated on the basis of the classification result of each image piece shown in the image chart 56 in FIG. 10, it is as follows. That is, in the image chart 56, the number of plants is 30, the number of sky is 28, and the number of artifacts is 20, so that the nature level is

{20−(30+20)/78=−0.49 (7).

A nature level of 0 is the intermediate value of the nature level. So if it is evaluated "to be appropriately urbanized" when the nature level is 0, then a nature level of −0.49 can be evaluated "not to be appropriately urbanized", for example.

The characteristic judgment device 18 reads the nature level judgment equation from the data storage area of the memory apparatus 24 when judging the nature level in the characteristic judgment process. In contrast, it reads the urban level judgment equation from the data storage area of the memory apparatus 24 when judging the urban level.

Then, the characteristic judgment device 18 reads the number of each image piece (the totalized results) with the classification result necessary for the characteristic judgment, such as nature level judgment and urban level judgment, from the work area of the memory apparatus 24.

Then, the characteristic judgment device 18 applies the number of each image piece read from the work area of the memory apparatus 24, to the characteristic judgment equation (the nature level judgment equation or the urban level judgment equation or the like) to perform operation. By this, the degree of characteristic is obtained which indicates the characteristic of the scene or the like included in the image corresponding to one image data which is a judgment target. That is, there are obtained the degree of nature which indicates the nature level of the image corresponding to one image data which is a judgment target and the degree of urbanization which indicates the urban level of the image corresponding to one image data which is a judgment target. For example, if the degree of nature and the degree of urbanization of the image 52 in FIG. 5 are operated on the basis of the classification result of each image piece shown in the image chart 56 in FIG. 10, the former is 0.13 and the latter is −0.49 (refer to the equations (4) and (7)). Incidentally, the degree of characteristic is a specific example of characteristic information.

Then, the characteristic judgment device 18 stores the degree of characteristic, i.e. the degree of nature or the degree of urbanization or the like, into the work area of the memory apparatus 24 (step S9 in FIG. 2). At this time, the image characteristic judgment device 18 stores the degree of characteristic of the scene or the like included in the image corresponding to the image data which is a judgment target, in association with the position information which indicates the image shooting position and the time information which indicates the image shooting year, month, date, and time point.

Incidentally, in the aforementioned characteristic judgment process, each image piece may be weighted in accordance with the distance between the camera 11 and one portion of the scene or the like included in each image piece. That is, if the distance between the camera 11 and one portion of the scene or the like included in a certain image piece is longer than the distance between the camera 11 and one portion of the scene or the like included in another image piece, the characteristic judgment device 18 performs the characteristic judgment process by increasing the weight for the image piece more than that for another image piece.

That is, firstly, the distance recognition device 19 recognizes the distance between the camera 11 and one portion of the scene or the like included in a certain image piece. For example, while the movable body moves, the scene or the like is shot with the camera 11 twice in a row in a short period (e.g. about 1 second). By this, two image data are obtained. The image data are obtained by the continuous shooting in the short period during the travel of the movable body. Thus, if the images corresponding to the two image data are compared, an object or the like near the camera 11 significantly moves, but an object or the like far away from the camera hardly moves. Then, the distance recognition device 19 detects, for each image piece, the amount of movement in one portion of the scene or the like included in the image piece. By this, a relatively large amount of movement is detected for the object or the like near the camera 11, and a relatively small amount of movement is detected for the object or the like far away from the camera 11. Then, the distance recognition device 19 weights the image piece so as to attach significance to the image piece including the object or the like in which the small amount of movement is detected more than to the image piece including the object or the like in which the large amount of movement is detected, in the characteristic judgment process.

The weighting is performed, for example, as follows. At the beginning of the characteristic judgment process, the characteristic judgment device 18 totalizes the classification results while weighting the image pieces. For example, it is assumed that the classification result of the image piece without weighting is 1 and the classification result of the image piece with weighting is 1.1. In this case, if there are 15 image pieces with the classification result of "plant" and without weighting and 15 image pieces with the classification result of "plant" and with weighting, the totalized result of the image pieces with the classification result of "plant" is $$1 \times 15 + 1.1 \times 15 = 31.5 \qquad (8).$$

Incidentally, for convenience of explanation, the weighting is performed in two stages (weighting constants 0, 1.1); however, the weighting may be performed in multi stages. For example, the weighting may be performed in five stages with weighting constants of 0.8, 0.9, 0, 1.1, and 1.2.

The image 52 in FIG. 4 and an image 57 in FIG. 11 are obtained by shooting the scene or the like twice in a row in the short period. By detecting the amount of movement on the basis of the image pieces of the image 52 and the image pieces of the image 57 and weighting the image pieces of the image 52 on the basis of the detection result, an image chart 58 in FIG. 12 is obtained.

Incidentally, the sky is infinity, so if the "sky" is weighted as with the other objects, it is likely weighted too much. Thus, if the sky is included in the scene which is a shooting target, the "sky" does not have to be weighted. By this, it is possible to improve the accuracy of the characteristic judgment.

(Use of Degree of Characteristic)

The image analyzing apparatus 1 stores the degree of characteristic (the degree of nature, the degree of urbanization, or the like) as the result of the characteristic judgment process, into the work area of the memory apparatus 24. The degree of characteristic can be used as follows.

Firstly, the degree of characteristic can be used to make a distribution map or a map. FIG. 13 is a nature distribution map in a particular area (Tokyo). Such a nature distribution map can be prepared as follows. That is, the image analyzing apparatus 1 is mounted on an automobile, and it drives in various places in the relevant area to shoot the scene or the like in various places in the area. Then, the degree of nature is judged in various places in the area, and it is stored into the memory apparatus 24. Then, a map for the area is colored in accordance with the degree of nature in various places in the area. In coloring the map in accordance with the degree of nature, the position information stored in the memory apparatus 24 in association with the degree of nature (the position information generated by the position information generation device 21) is used. By using the position information, the relationship between the degree of nature and a position on the map becomes clear, so that the coloring can be performed easily.

As described above, according to the method in which the scene or the like is shot by the image analyzing apparatus 1 mounted on an automobile or the like and the distribution map or the map is prepared by using the degree of characteristic obtained by the shooting, it is possible to prepare the distribution map or the map, more highly accurately than a method in which the distribution map or the map is prepared by using aerial images. That is, there is known the method in which image processing or the like is performed on aerial images shot by satellite and the distribution map or the map is prepared on the basis of the degree of nature obtained by the image processing. In this method, however, the shooting is performed from the sky, so that buildings hidden in forests cannot be treated as images. As a result, it is hard to prepare the distribution map or the map highly accurately. In contrast, according to the method in which the distribution map or the map is prepared by using the degree of characteristic obtained by the image analyzing apparatus 1, the shooting is performed on the road, so that the buildings hidden in forests can be certainly treated as images. As a result, it is possible to prepare the distribution map or the map highly accurately.

Secondly, it is possible to prepare a chart showing a temporal change in the characteristic of the scene or the like, such as the extent of development of urbanization in a certain place. Such a chart can be prepared as follows. That is, the image analyzing apparatus 1 is mounted on an automobile, and it drives in the relevant place to shoot the scene or the like in the place. Then, the urban level is judged in the place, and the degree of urbanization is stored into the memory apparatus 24. Moreover, the scene of the place is shot at predetermined intervals (e.g. every 6 months), and at each time, the urban level of the place is judged and the degree of urbanization is stored into the memory apparatus 24. Then, after the scene shooting is performed a certain degree of times, the degree of urbanization of the place stored in the memory apparatus 24 is read, and a chart is prepared on the basis of the degree of urbanization. In preparing the chart, the time information stored in the memory apparatus 24 in association with the degree of urbanization (the time information generated by the time information generation device 22) is used. By using the time information, the relationship between the degree of urbanization and time (year, month, date) is obtained, so that it is possible to prepare the chart easily.

As explained above, according to the image analyzing apparatus 1, the color analysis process, the fractal dimension analysis process, and the artifact amount recognition process are performed, and the characteristic of the image is judged by combining the results of these processes. Thus, it is possible to highly accurately specify the type of one portion of the scene included in the image, the objects included in the scene, one portion of the objects included in the scene, or the like. Moreover, it is possible to highly accurately judge the entire characteristic of the scene or the like included in the image.

Moreover, according to the image analyzing apparatus 1, the classification is performed on each image piece, the classification results are totalized, and the characteristic judgment of the scene or the like is performed on the basis of the totalized result. Thus, it is possible to judge the characteristic of the scene or the like, highly accurately.

Moreover, according to the image analyzing apparatus 1, in the characteristic judgment process, the characteristic of the scene or the like is judged by using the number of plus elements and the number of minus elements. Thus, it is possible to judge the characteristic of the scene or the like, highly accurately.

Moreover, only the image analyzing apparatus 1 or the camera 11 is mounted on the movable body, and the scene or the like is shot with the movable body traveling in order to perform the characteristic judgment or the like. Thus, it is possible to perform the characteristic judgment of the scene in a wide range of places, easily and quickly.

Moreover, as described above, if the image piece is weighted in accordance with the distance between the camera 11 and the scene or the like which is a shooting target, it is possible to further improve the accuracy of the characteristic judgment of the scene or the like.

Moreover, as described above, the shooting of the scene or the like is performed again if it is recognized that an obstacle is approaching the camera 11 and the obstacle is blocking between the camera 11 and the scene or the like which is a shooting target. Thus, it is possible to perform the characteristic judgment of the scene or the like only for the image which appropriately includes the scene or the like and on which the characteristic judgment of the scene or the like can be appropriately performed. Therefore, it is possible to improve the efficiency in the characteristic judgment process or the like, to improve the accuracy of the judgment, and to improve reliability of the degree of characteristic obtained by the characteristic judgment process.

Incidentally, in the aforementioned explanation, the camera 11 is a specific example of the shooting device, and the camera 11 and the input device 12 are a specific example of the image obtaining device. Moreover, the image division device 13 is a specific example of the image dividing device, the color analysis device 14 is a specific example of the color analyzing device, the fractal dimension analysis device 15 is a specific example of the fractal dimension analyzing device, and the artifact amount recognition device 16 is a specific example of the artifact amount recognizing device. Moreover, the classification device 17 is a specific example of the classifying device, and the characteristic judgment device 18 is a specific example of the characteristic judging device. Moreover, the obstacle recognition device 20 is a specific example of the obstacle recognizing device, and the distance recognition device 19 is a specific example of the distance recognizing device. Moreover, the memory apparatus 24 is a specific example of the information holding device.

Moreover, the step S1 is a specific example of the image obtaining process, the step S2 is a specific example of the image dividing process, and the step S3 is a specific example of the color analyzing process. Moreover, the step S4 is a specific example of the fractal dimension analyzing process, and the step S5 is a specific example of the artifact amount recognizing process. Moreover, the step S7 is a specific example of the classifying process, and the step S8 is a specific example of the characteristic judging process.

Another Embodiment 1

In the color analysis process shown in FIG. 6, the image analyzing apparatus 1 judges whether or not the hue of the pixel is a blue area, to thereby perform the blue-sky judgment (the step S37 in FIG. 6). Moreover, the image analyzing apparatus 1 calculates the blue-sky ratio on the basis of the result of the blue-sky judgment (the step S40 in FIG. 6). Then, in the classification process (the step S7 in FIG. 2), the image analyzing apparatus 1 specifies the type of one portion of the scene or the like included in the image piece when the green ratio about the image piece is low, the blue-sky ratio is high, the sign ratio is low, the fractal dimension analysis value is low, and the artifact amount count value is 0. Then, it classifies the image piece to the classification item of "sky" (refer to FIG. 9). In this manner, the image analyzing apparatus 1 judges the area of sky shown in the image.

By the way, depending on the shooting circumstances, the sky shown in the image is sometimes a cloudy sky, a sunset, or the like. Alternatively, the sky image is sometimes an overexposed or blown-out image; namely, an image in which lightness reaches the upper limit and is saturated. In this case, in the color analysis process, the sky area may not be able to be judged highly accurately sometimes, only by simply judging whether or not the hue of the pixel is the blue area. In this case, it is desirable to perform a sky color range setting process described below. The sky color range setting process is desirably performed after the image division process (the step S2 in FIG. 2) and before the color analysis process (the step S3 in FIG. 2).

FIG. 15 shows the sky color range setting process. In the sky color range setting process, firstly, the image analyzing apparatus 1 detects a variance value of lightness of the pixels which constitute the image piece, and an average value of each of the hue, lightness and saturation (HLS) of the pixels which constitute the image piece (step S51).

Then, the image analyzing apparatus 1 selects one image piece (referred to as a "target image piece") from the image pieces which constitute the image corresponding to the image data (step S52). Here, it is assumed that there are n image pieces arranged in a lateral direction (x-axis direction) from left to right in the image corresponding to the image data and that there are m image pieces arranged in a longitudinal direction (y-axis direction) from top to bottom; namely it is assumed that the image is formed of n×m image pieces. In this case, if the coordinates of four corners in a position of the image piece in the image are (0, 0), (n, 0), (n, m), and (0, m), the image analyzing apparatus 1 selects the target image piece one by one from the image pieces existing in a range surrounded by coordinates (1, 1), (n−1, 1), (n−1, m−1), and (1, m−1). Incidentally, in most cases, the sky is shown in the upper half of the image. Thus, the target image piece may be selected from the image pieces in a range surrounded by (1, 1), (n−1, 1), (n−1, m/2), and (1, m/2).

Then, the image analyzing apparatus 1 investigates a variance value of lightness of the selected one target image piece and a variance value of lightness of image pieces in the surroundings of the target image piece (e.g. eight image pieces surrounding the target image piece) (step S53). This investigation uses the detection result in the step S51.

Then, the image analyzing apparatus 1 judges whether or not the variance values of lightness of the target image piece and the image pieces around are small (step S54). For example, if the variance value of lightness has a maximum value of 100, the image analyzing apparatus 1 judges that the variance value of lightness is small when the variance value of lightness is about 10 or less.

Of the target image piece and the image pieces around, if the variance values of lightness of all the image pieces are small (the step S54: YES), the image analyzing apparatus 1 stores the average value of each of hue, lightness, and saturation of the target image piece, into the memory apparatus 24 (step S55). On the other hand, of the target image piece and the image pieces around, if any of the variance values of lightness of the image pieces are not small (the step S54: NO), the image analyzing apparatus 1 does not perform the step S55 and shifts the process to a step S56.

Then, the image analyzing apparatus 1 judges whether or not the processes in the step S52 to the step S55 are performed on all the target image pieces (step S56). If the processes in the step S52 to the step S55 are not performed on all the target image pieces (the step S56: NO), the image analyzing apparatus 1 returns the process to the step S52, selects an unprocessed target image piece, and continues the process.

On the other hand, if the processes in the step S52 to the step S55 are performed on all the target image pieces (the step S56: YES), then the image analyzing apparatus 1 determines a range of each of hue, lightness, and saturation of each target image piece, on the basis of the average value of each of hue, lightness, and saturation of each target image piece (step S57). That is, from among the average values of hue about all the target image pieces, the minimum average value and the maximum average value are investigated, and the minimum average value is set to the lower limit of the hue range, and the maximum average value is set to the upper limit of the hue range. Similarly, from among the average values of lightness about all the target image pieces, the minimum average value and the maximum average value are investigated, and the minimum average value is set to the lower limit of the lightness range, and the maximum average value is set to the upper limit of the lightness range. Similarly, from among the average values of saturation about all the target image pieces, the minimum average value and the maximum average value are investigated, and the minimum average value is set to the lower limit of the saturation range, and the maximum average value is set to the upper limit of the saturation range. Then, the image analyzing apparatus 1 stores the hue range, the lightness range, and the saturation range into the memory apparatus 24.

The hue range, the lightness range, and the saturation range indicate the color range of the sky shown in the image corresponding to the image data.

The image analyzing apparatus 1 performs the color analysis process following the sky color range setting process. In the color analysis process in the embodiment, the following process is performed instead of the processes in the step S37 and the step S38 in FIG. 6. That is, the image analyzing apparatus 1 (the color analysis device 14) judges whether or not the hue, lightness, and saturation of the pixel which is a processing target belong to the hue range, the lightness range, and the saturation range, respectively. If the hue, lightness, and saturation of the pixel which is a processing target belong to the hue range, the lightness range, and the saturation range, respectively, the image analyzing apparatus 1 judges that the image satisfies a sky reference and increases a sky count value. On the other hand, if the hue of the pixel does not belong to the hue range, the lightness of the pixel does not belong to the lightness range, or the saturation of the pixel does not belong to the saturation range, the image analyzing apparatus 1 judges that the image does not satisfy the sky reference and does not increase the sky count value. Moreover, if such a process is performed, a sky ratio is calculated instead of the blue-sky ratio in the step S40 in FIG. 6. Then, in the classification process (the step S7 in FIG. 2), the sky ratio is used instead of the blue-sky ratio.

As explained above, by performing the sky color range setting process and performing the sky judgment and the calculation of the sky ratio on the basis of the color range of the sky, it is possible to judge the sky area, highly accurately.

Incidentally, in the step S51 in FIG. 15, instead of or in addition to the variance value of lightness, the variance value of saturation or the variance value of hue may be detected and used in the step S53 or the like. Moreover, the color range of the sky may be determined only from any one of the hue range, the lightness range, and the saturation range, or it may be determined from a combination of two of them.

Another Embodiment 2

If the aforementioned sky color range setting process is performed, it is possible to obtain the color information about the sky in the image, on the basis of the hue range, the lightness range, and the saturation range stored in the memory apparatus 24. On the basis of the color information, the threshold value of the sign reference or the green reference in the color analysis process may be changed.

For example, from the color information about the sky, a sky condition, such as a blue sky, a cloudy sky, a sunset, and backlight, or weather is judged. If it is judged to be a cloudy sky, plants and signs are shown dark. Thus, the threshold value of lightness or saturation may be reduced. If it is judged to be a sunset, plants and signs are shown rather reddish. Thus, the threshold value of hue may be changed. If it is judged to be backlight, the image of the sky is overexposed or blown out, so that plants and signs are shown dark. Thus, the threshold of lightness or saturation may be reduced.

By changing the threshold value of the sign reference or the green reference on the basis of the color information about the sky, it is possible to improve the accuracy of the sign judgment or the green judgment.

Another Embodiment 3

In the aforementioned classification process of the image analyzing apparatus 1, it is exemplified that the image piece is classified to the classification items of "plant", "sky", and "artifact"; however, the present invention is not limited to this. For example, a classification item of "electric wire" may be added.

For example, if the green ratio about the image piece which is a processing target is low (e.g. 0.5 or less), the blue-sky ratio is high (e.g. more than 0.5), the sign ratio is low (e.g. 0.5 or less), the fractal dimension analysis value is high (e.g. more than 1.0), and the artifact amount count value is 0, the type of one portion of the scene or the like included in the image piece is specified as an electric wire, and the image piece is classified into the classification item of "electric wire". Alternatively, the electric wire may be classified into the classification item of "artifact". By this, it is possible to further improve the accuracy of the characteristic judgment of the scene or the like.

Incidentally, when the classification process about the electric wire is performed, in some cases it is hard to highly accurately distinguish between the electric wire and the outline of buildings or the lines of far mountains on the basis of only the green ratio, the blue-sky ratio, the sign ratio, the fractal dimension analysis value, and the artifact amount count value. Thus, the classification process about the electric wire may be performed with reference to the result of investigating whether the image shown in the target image piece is the sky or the electric wire, in the same manner as the aforementioned sky color range setting process.

Another Embodiment 4

In the aforementioned the characteristic judgment process of the image analyzing apparatus 1 (the step S8 in FIG. 2), it is exemplified that the nature level and the urban level are judged. In addition to this, an open road level may be judged. The open road level indicates the extent that there are neither high trees nor buildings around a road and the scene around the road is open. The judgment equation of the open road level is as follows.

The open road level=(the number of sky−the number of plants)/the total number of judgment elements (9)

Incidentally, the total number of judgment elements=the number of plants+the number of sky+the number of artifacts (10)

When the open road level is judged, only the image piece which belongs to the upper half of the image may be a judgment target. By this, it is possible to improve the accuracy of the judgment of the open road level. That is, if the scene shown in the image is an open road, the scene in the upper half of the image is important to judge the open road level, and the scene in the lower half of the image is not important to judge the open road level. The scene in the lower half of the image rather interferes with the judgment of the open road level. For example, even in the open road, if there is a field on the side of the road, short plants will be shown in the lower half of the image. As a result, the number of plants will be large, and the open road level according to the aforementioned equation (9) will become small. Therefore, it is possible to improve the accuracy of the judgment of the open road level by eliminating the scene in the lower half of the image from the judgment target of the open road level.

Moreover, in judging the open road level, only the image piece which belongs to the upper side of a horizon shown in the image may be a judgment target. In this case, for example, a vanishing point of the road in the image is detected, and the position of the horizon is specified on the basis of the vanishing point. In this case, an intersection of extension lines of lines (e.g. white lines) which extend along the both edges of the road is detected, and this can be used as the vanishing point.

Another Embodiment 5

In the aforementioned color analysis process of the image analyzing apparatus 1, it is exemplified that the sign judgment, the green judgment, and the blue-sky judgment are performed, and that the sign ratio, the green ratio, and the blue-sky ratio are calculated. The present invention, however, is not limited to this. For example, instead of or in addition to the sign judgment, the green judgment, and the blue-sky judgment, red judgment or yellow judgment or the like may be performed. Then, on the basis of the result of the red judgment or yellow judgment, a fall-foliage ratio may be calculated. In this case, a classification item of "fall foliage" is provided in the classification process. By this, it is possible to judge a fall-foliage level of the scene or the like on the basis of the number of image pieces with the classification result of "fall foliage" in the characteristic judgment process. Then, by using the fall-foliage ratio, it is possible to prepare a fall-foliage graph, i.e. a graph which shows a temporal change in the extent of the fall foliage in a certain place.

Another Embodiment 6

Instead of or in addition to the sign judgment, the green judgment, and the blue-sky judgment, gray judgment may be performed. Then, on the basis of the result of the gray judgment, a road ratio may be calculated. In this case, a classification item of "road" is provided in the classification process. By this, it is possible to judge the urban level of the scene or the like on the basis of the number of image pieces with the classification result of "road" in the characteristic judgment process.

Another Embodiment 7

In the aforementioned image analyzing apparatus 1, it is exemplified that the color analysis process, the fractal dimension analysis process, and the artifact amount recognition process are performed on one image piece, and that the type of one portion of the scene or the like included in the image piece is specified on the basis of the combination of the results obtained by those three processes. The present invention, however, is not limited to this. For example, the color analysis process and the fractal dimension analysis process may be performed on one image piece, and the type of one portion of the scene or the like included in the image piece may be specified on the basis of the combination of the results obtained by those two processes. Alternatively, the color analysis process and the artifact amount recognition process may be performed on one image piece, and the type of one portion of the scene or the like included in the image piece may be specified on the basis of the combination of the results obtained by those two processes. Looking overall, the specification of the type of one portion of the scene or the like based on the combination of the results obtained by the three processes allows more accurate type specification than that based on the combination of the results obtained by the two processes. However, using only the combination of the results obtained by the two processes sometimes allows sufficiently accurate type specification, depending on the type to be specified. In such a case, it is possible to set the two processes and improve a processing speed.

Another Embodiment 8

In the aforementioned characteristic judgment process of the image analyzing apparatus 1, it is exemplified that the characteristic level is expressed with numeric values of −1 to +1; however, the present invention is not limited to this. For example, the characteristic level may be expressed with numeric values of 0 to 100. In this case, the characteristic level is converted such that −1 corresponds to 0, 0 corresponds to 50, and 1 corresponds to 100.

Another Embodiment 9

In the aforementioned characteristic judgment process of the image analyzing apparatus 1, it is exemplified that the characteristic judgment is performed on the scene or the like by using the nature level judgment equation (2), the urban level judgment equation (5) or the like. The present invention, however, is not limited to this. Any method of the characteristic judgment can be used if it can select two or more of a plurality of classification items, it can compare the number of image pieces which belong to the respective selected classification items between the classification items, and it can judge the characteristic of the entire scene or the like included in the image on the basis of the comparison result. For example, by using the number of image pieces with the classification item of plants and the number of image pieces with the classification item of artifacts, the nature level may be calculated by the following equation.

Nature level=the number of plants/the number of artifacts (11)

However, rather than the equation (11), using the aforementioned equation (2) makes it possible to judge the nature level more highly accurately.

Another Embodiment 10

In the aforementioned image analyzing apparatus 1, it is exemplified that the operations shown in FIG. 2 are periodically performed at predetermined intervals; however, the present invention is not limited to this. For example, a person who judges the scene or the like manually performs the shooting, and the image analyzing apparatus 1 may perform the characteristic judgment of the scene or the like on the image data obtained b the shooting.

Another Embodiment 11

The aforementioned embodiments may be realized in a unified form with hardware as an exclusive apparatus, or may be realized by making a computer read a program. If they are realized by making a computer read a program, the program is prepared to make the computer operate as the image obtaining device, the image dividing device, the color analyzing device, the fractal dimension analyzing device, the artifact amount recognizing device, the classifying device, and the characteristic judging device.

Moreover, in the present invention, various changes may be made without departing from the essence or spirit of the invention which can be read from the claims and the entire specification. An image analyzing apparatus, an image analyzing method, and a computer program that realizes these functions, all of which involve such changes, are also intended to be within the technical scope of the present invention.

INDUSTRIAL APPLICABILITY

The image analyzing apparatus and the image analyzing method according to the present invention can be applied to image analysis for analyzing an image shot with a camera or the like to judge characteristics about the content of the image, such as an object and a scene included in the image. Moreover, they can be applied to an image analyzing apparatus or the like, which is mounted on or can be connected to various computer equipment for consumer use or business use, for example.

The invention claimed is:

1. An image analyzing apparatus comprising:
an image obtaining device for obtaining an image;
an image dividing device for dividing the image into a plurality of image pieces;
a color analyzing device for analyzing a color property in each image piece;
a fractal dimension analyzing device for performing a fractal dimension analysis in each image piece;
a classifying device for specifying a type of an object, one portion of the object, one portion of a scene included in each image piece, on the basis of a color analysis result by said color analyzing device and a fractal dimension analysis result by said fractal dimension analyzing device, and classifying each image piece on the basis of the type;
a distance recognizing device for recognizing a distance between a predetermined position of said image analyzing apparatus and the object, one portion of the object, or one portion of the scene included in the image piece; and
a characteristic judging device for judging a characteristic of the entire object, an entire object aggregate, or the entire scene included in the image on the basis of a classification result by said classifying device which is weighted in accordance with the distance on each image piece.

2. An image analyzing apparatus comprising:
an image obtaining device for obtaining an image;
an image dividing device for dividing the image into a plurality of image pieces;
a color analyzing device for analyzing a color property in each image piece;
an artifact amount recognizing device for recognizing an amount of an artifact or an artificial portion included in each image piece;
a classifying device for specifying a type of an object, one portion of the object, one portion of a scene included in each image piece, on the basis of a color analysis result by said color analyzing device and a recognition result of the amount of the artifact or the artificial portion by said artifact amount recognizing device, and classifying each image piece on the basis of the type;
a distance recognizing device for recognizing a distance between a predetermined position of said image analyzing apparatus and the object, one portion of the object, or one portion of the scene included in the image piece; and
a characteristic judging device for judging a characteristic of the entire object, an entire object aggregate, or the entire scene included in the image on the basis of a classification result by said classifying device which is weighted in accordance with the distance on each image piece.

3. An image analyzing apparatus comprising:
an image obtaining device for obtaining an image;
an image dividing device for dividing the image into a plurality of image pieces;
a color analyzing device for analyzing a color property in each image piece;
a fractal dimension analyzing device for performing a fractal dimension analysis in each image piece;
an artifact amount recognizing device for recognizing an amount of an artifact or an artificial portion included in each image piece;
a classifying device for specifying a type of an object, one portion of the object, one portion of a scene included in each image piece, on the basis of a color analysis result by said color analyzing device, a fractal dimension analysis result by said fractal dimension analyzing device, and a recognition result of the amount of the artifact or the artificial portion by said artifact amount recognizing device, and classifying each image piece on the basis of the type;
a distance recognizing device for recognizing a distance between a predetermined position of said image analyzing apparatus and the object, one portion of the object, or one portion of the scene included in the image piece; and
a characteristic judging device for judging a characteristic of the entire object, an entire object aggregate, or the entire scene included in the image on the basis of a classification result by said classifying device which is weighted in accordance with the distance on each image piece.

4. The image analyzing apparatus according to claim 1, wherein
said classifying device classifies each image piece into a plurality of classification items, and said characteristic judging device selects two or more of the plurality of classification items, compares the number of image pieces which belong to the respective selected classification items between the classification items, and judges the characteristic of the entire object, the entire object aggregate, or the entire scene included in the image on the basis of the comparison result.

5. The image analyzing apparatus according to claim 1, wherein
said classifying device specifies the object, one portion of the object, or one portion of the scene included in the image piece to be a natural object or an artifact, and classifies the image piece to a first classification item when the object, one portion of the object, or one portion of the scene is the natural object, and classifies the image piece to a second classification item when the object, one portion of the object, or one portion of the scene is the artifact, and
said characteristic judging device compares the number of the image pieces which belong to the first classification item with the number of the image pieces which belong to the second classification item, and judges a nature level or an urban level of the entire object, the entire object aggregate, or the entire scene included in the image, on the basis of the comparison result.

6. The image analyzing apparatus according to claim 1, wherein said color analyzing device comprises a sign ratio calculating device for calculating a sign ratio of the image piece.

7. The image analyzing apparatus according to claim 1, wherein said color analyzing device comprises a green ratio calculating device for calculating a green ratio of the image piece.

8. The image analyzing apparatus according to claim 1, wherein said color analyzing device comprises a blue-sky ratio calculating device for calculating a blue-sky ratio of the image piece.

9. The image analyzing apparatus according to claim 2, wherein said artifact amount recognizing device detects an edge component with a predetermined length or more which continuously extends in a longitudinal direction in the image piece, and recognizes the amount of the artifact or the artificial portion on the basis of a detected amount of the edge component.

10. The image analyzing apparatus according to claim 1, wherein said image obtaining device comprises a shooting device for shooting the object, the object aggregate, or the scene.

11. The image analyzing apparatus according to claim 10, wherein
the shooting device is mounted on a movable body, and
said image obtaining device obtains the image in each predetermined travel distance of the movable body or each predetermined travel time by using the shooting device.

12. The image analyzing apparatus according to claim 10, wherein said image obtaining device comprises an obstacle recognizing device for recognizing that an obstacle is approaching the shooting device and the obstacle is blocking between the shooting device and the object, the object aggregate, or the scene which is a shooting target.

13. The image analyzing apparatus according to claim 10, wherein said distance recognizing device recognizes a distance between the shooting device and the object, one portion of the object, or one portion of the scene included in the image piece.

14. The image analyzing apparatus according to claim 13, wherein if the distance between the shooting device and the object, one portion of the object, or one portion of the scene included in one image piece is longer than a distance between the shooting device and the object, one portion of the object, or one portion of the scene included in another image piece, said characteristic judging device increases weight for the one image piece more than that for another image piece and judges the characteristic of the entire object, the entire object aggregate, or the entire scene included in the image.

15. The image analyzing apparatus according to claim 10, wherein said characteristic judging device comprises an information holding device for generating characteristic information which indicates the characteristic of the entire object, the entire object aggregate, or the entire scene included in the image and holding the characteristic information as well as position information which indicates a shooting position of the shooting device, in a recording medium or a memory element.

16. The image analyzing apparatus according to claim 10, wherein said characteristic judging device comprises an information holding device for generating characteristic information which indicates the characteristic of the entire object, the entire object aggregate, or the entire scene included in the image and holding the characteristic information as well as time information which indicates a shooting month, date, or time point of the shooting device, in a recording medium or a memory element.

17. An image analyzing method comprising:
an image obtaining process of obtaining an image;
an image dividing process of dividing the image into a plurality of image pieces;
a color analyzing process of analyzing a color property in each image piece;
a fractal dimension analyzing process of performing a fractal dimension analysis in each image piece;
a classifying process of specifying a type of an object, one portion of the object, one portion of a scene included in each image piece, on the basis of a color analysis result by said color analyzing process and a fractal dimension analysis result by said fractal dimension analyzing process, and classifying each image piece on the basis of the type;
a distance recognizing process of recognizing a distance between a predetermined position and the object, one portion of the object, or one portion of the scene included in the image piece; and
a characteristic judging process of judging a characteristic of the entire object, an entire object aggregate, or the entire scene included in the image on the basis of a classification result by said classifying process which is weighted in accordance with the distance on each image piece.

18. An image analyzing method comprising:
an image obtaining process of obtaining an image;
an image dividing process of dividing the image into a plurality of image pieces;
a color analyzing process of analyzing a color property in each image piece;
an artifact amount recognizing process of recognizing an amount of an artifact or an artificial portion included in each image piece;
a classifying process of specifying a type of an object, one portion of the object, one portion of a scene included in each image piece, on the basis of a color analysis result by said color analyzing process and a recognition result of the amount of the artifact or the artificial portion by said artifact amount recognizing process, and classifying each image piece on the basis of the type;

a distance recognizing process of recognizing a distance between a predetermined position and the object, one portion of the object, or one portion of the scene included in the image piece; and a characteristic judging process of judging a characteristic of the entire object, an entire object aggregate, or the entire scene included in the image on the basis of a classification result by said classifying process which is weighted in accordance with the distance on each image piece.

19. An image analyzing method comprising:

an image obtaining process of obtaining an image;

an image dividing process of dividing the image into a plurality of image pieces;

a color analyzing process of analyzing a color property in each image piece;

a fractal dimension analyzing process of performing a fractal dimension analysis in each image piece;

an artifact amount recognizing process of recognizing an amount of an artifact or an artificial portion included in each image piece;

a classifying process of specifying a type of an object, one portion of the object, one portion of a scene included in each image piece, on the basis of a color analysis result by said color analyzing process, a fractal dimension analysis result by said fractal dimension analyzing process, and a recognition result of the amount of the artifact or the artificial portion by said artifact amount recognizing process, and classifying each image piece on the basis of the type;

a distance recognizing process of recognizing a distance between a predetermined position and the object, one portion of the object, or one portion of the scene included in the image piece; and a characteristic judging process of judging a characteristic of the entire object, an entire object aggregate, or the entire scene included in the image on the basis of a classification result by said classifying process which is weighted in accordance with the distance on each image piece.

20. A not transitory computer readable medium for making a computer function as the image analyzing apparatus according to claim 1.

21. A not transitory computer readable medium for making a computer function as the image analyzing apparatus according to claim 2.

22. A not transitory computer readable medium for making a computer function as the image analyzing apparatus according to claim 3.

* * * * *